(12) United States Patent
Lin

(10) Patent No.: US 11,468,666 B2
(45) Date of Patent: Oct. 11, 2022

(54) READING SUPPORT SYSTEM AND MOVING BODY

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventor: Chiayu Lin, Ota (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 23 days.

(21) Appl. No.: 17/197,343

(22) Filed: Mar. 10, 2021

(65) Prior Publication Data
US 2021/0201026 A1 Jul. 1, 2021

Related U.S. Application Data

(63) Continuation of application No. PCT/JP2019/037258, filed on Sep. 24, 2019.

(30) Foreign Application Priority Data

Dec. 12, 2018 (JP) .............................. JP2018-232730

(51) Int. Cl.
*G06V 20/10* (2022.01)
*G06T 7/11* (2017.01)
(Continued)

(52) U.S. Cl.
CPC ........... *G06V 20/10* (2022.01); *G06K 9/6267* (2013.01); *G06T 7/11* (2017.01); *G06T 7/70* (2017.01);
(Continued)

(58) Field of Classification Search
CPC ........ G06V 20/10; G06V 20/46; G06V 20/17; G06V 20/62; G06V 20/13; G06V 10/22;
(Continued)

(56) References Cited

U.S. PATENT DOCUMENTS 8,594,365 B2 * 11/2013 Derkalousdian ......... G06K 9/00
382/152
10,430,656 B2 * 10/2019 Kennedy ................. H04L 67/00
(Continued)

FOREIGN PATENT DOCUMENTS

JP 7-19814 A 1/1995
JP 2004-133560 A 4/2004
(Continued)

OTHER PUBLICATIONS

International Search Report dated Dec. 10, 2019 in PCT/JP2019/037258 filed Sep. 24, 2019, 4 pages.

*Primary Examiner* — John B Strege
(74) *Attorney, Agent, or Firm* — Oblon, McClelland, Maier & Neustadt, L.L.P.

(57) ABSTRACT

According to one embodiment, a reading support system includes a processing device. The processing device includes an extractor and a type determiner. The extractor extracts a plurality of regions from a candidate region. The candidate region is a candidate of a region in which a meter is imaged. The regions respectively include a plurality of characters of the meter. The type determiner determines a type of the meter based on positions of the regions.

22 Claims, 19 Drawing Sheets

(51) Int. Cl.
*G06T 7/70* (2017.01)
*G06K 9/62* (2022.01)
*G06V 10/22* (2022.01)
*G06V 10/40* (2022.01)
*G06V 20/40* (2022.01)
*G06V 30/14* (2022.01)
*G08C 19/36* (2006.01)
*G06V 30/10* (2022.01)

(52) U.S. Cl.
CPC .............. *G06V 10/22* (2022.01); *G06V 10/40* (2022.01); *G06V 20/46* (2022.01); *G06V 30/1444* (2022.01); *G06T 2207/10016* (2013.01); *G06V 30/10* (2022.01); *G08C 19/36* (2013.01)

(58) Field of Classification Search
CPC .... G06V 10/40; G06V 10/44; G06V 30/1444; G06V 30/10; G06K 9/6267; G06T 7/11; G06T 7/70; G06T 2207/10016; G06T 1/00; G08C 19/36; G08C 15/00; G08C 19/00
See application file for complete search history.

(56) References Cited

U.S. PATENT DOCUMENTS

| | | |
|---|---|---|
| 2001/0055425 A1 | 12/2001 | Chiu |
| 2005/0219632 A1 | 10/2005 | Maki et al. |
| 2006/0268359 A1 | 11/2006 | Maki et al. |
| 2012/0201423 A1 | 8/2012 | Onai et al. |
| 2017/0203653 A1* | 7/2017 | Ogasawara ............... G06T 3/60 |
| 2019/0095739 A1* | 3/2019 | Gao ...................... B60K 35/00 |
| 2021/0201026 A1* | 7/2021 | Lin ........................ G06V 20/13 |
| 2022/0137109 A1* | 5/2022 | Sundaresh ........... G01R 22/066 |
| | | 324/110 |

FOREIGN PATENT DOCUMENTS

| | | |
|---|---|---|
| JP | 2005-341452 A | 12/2005 |
| JP | 2006-120133 A | 5/2006 |
| JP | 3799408 B1 | 7/2006 |
| JP | 2007-114828 A | 5/2007 |
| JP | 2008-243103 A | 10/2008 |
| JP | 101498592 A | 8/2009 |
| JP | 2011-90374 A | 5/2011 |
| JP | 2014-32039 A | 2/2014 |
| JP | 5712801 B2 | 5/2015 |
| JP | 2017-126187 A | 7/2017 |
| JP | 2019-169116 A | 10/2019 |

* cited by examiner

READING SUPPORT SYSTEM AND MOVING BODY

CROSS-REFERENCE TO RELATED APPLICATIONS

This is a continuation application of International Application PCT/JP2019/037258, filed on Sep. 24, 2019. This application also claims priority to Japanese Patent Application No. 2018-232730, filed on Dec. 12, 2018. The entire contents of each are incorporated herein by reference.

FIELD

Embodiments described herein relate generally to a reading support system and a moving body.

BACKGROUND

There is a system used to read a value (an indication) of a meter. It is desirable for the system to perform processing that can read the indication with higher accuracy.

DETAILED DESCRIPTION

Figure 1:
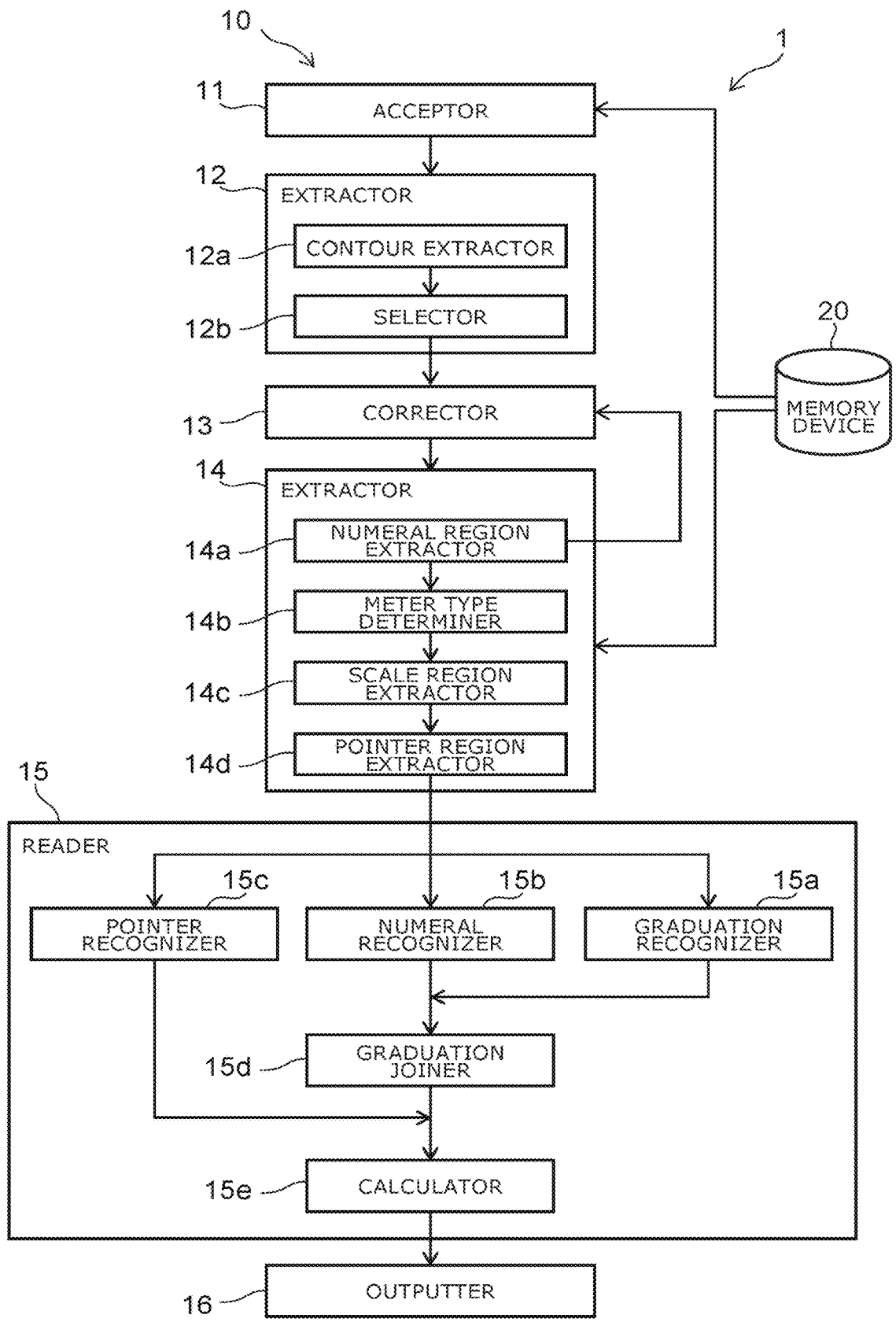
FIG. 1 is a block diagram illustrating the configuration of a reading support system according to a first embodiment.

According to one embodiment, a reading support system includes a processing device. The processing device includes an extractor and a type determiner. The extractor extracts a plurality of numeral regions from a candidate region. The candidate region is a candidate of a region in which a meter is imaged. The numeral regions respectively include a plurality of characters of the meter. The type determiner determines a type of the meter based on positions of the numeral regions.

Various embodiments are described below with reference to the accompanying drawings.

In the specification and drawings, components similar to those described previously or illustrated in an antecedent drawing are marked with like reference numerals, and a detailed description is omitted as appropriate.

First Embodiment

FIG. 1 is a block diagram illustrating the configuration of a reading support system according to a first embodiment.

FIGS. 2A to 2D are schematic views illustrating meters.

FIGS. 3A to 12 describe processing according to the reading support system according to the first embodiment.

The reading support system 1 is used when reading a value (an indication) shown by a meter from an image including the meter. The type of the object meter is arbitrary. For example, the reading support system 1 may be used to read the indications of round meters M1 and M2 such as those illustrated in FIGS. 2A and 2B. A round meter includes a pointer In rotating with some point as the center, multiple graduations Sc marked around the center point, and numerals Nu marked to correspond to at least a portion of the multiple graduations Sc. The graduations Sc are arranged in a circular configuration or a circular arc-like configuration. The round meter shows a value by the pointer In indicating a designated graduation Sc by one of the pointer In or the graduations Sc rotating along the arrangement direction of the graduations Sc.

Figure 2A:
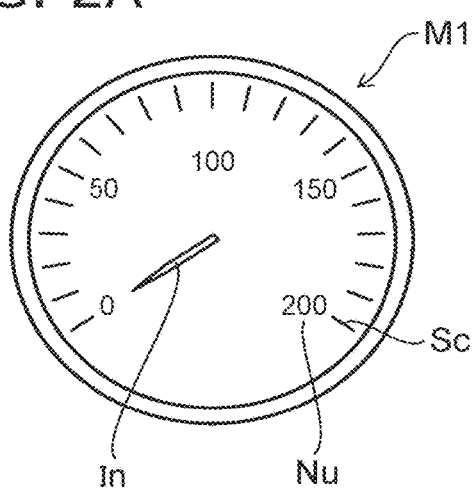
FIGS. 2A to 2D, FIGS. 3A to 3C, FIGS. 4A and 4B, FIGS. 5A to 5C, FIGS. 6A to 6D, FIGS. 7A to 7D, FIG. 8, FIGS. 9A to 9C, FIGS. 10A to 10C, FIG. 11, and FIG. 12 are schematic views illustrating meters.
Figure 2B:
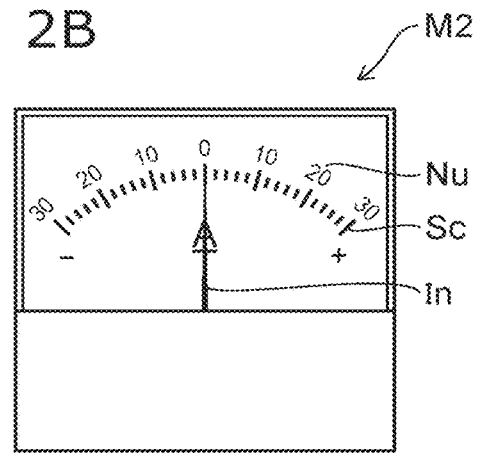
Figure 2C:
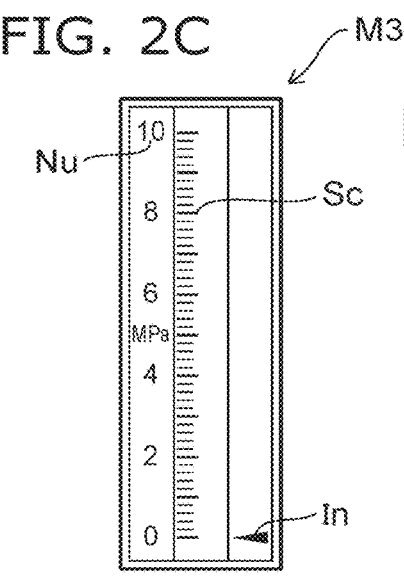
Figure 2D:
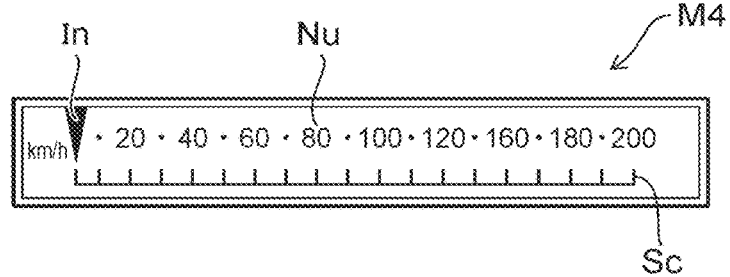

The reading support system 1 also can be used to read the indication of a vertical meter M3 such as that illustrated in FIG. 2C or a horizontal meter M4 such as that illustrated in FIG. 2D. Vertical meters and horizontal meters include the pointer In, the multiple graduations Sc arranged in one direction, and the numerals Nu marked to correspond to at least a portion of the multiple graduations Sc. Vertical meters and horizontal meters show a value by the pointer In indicating a designated graduation Sc by one of the pointer In or the graduations Sc moving along the arrangement direction of the graduations Sc.

As illustrated in FIG. 1, the reading support system 1 according to the first embodiment includes a processing device 10 and a memory device 20. The processing device 10 includes an extractor 14. In the example of FIG. 1, the processing device 10 further includes an acceptor 11, an extractor 12, a corrector 13, a reader 15, and an outputter 16.

For example, an external imaging device acquires a static image by imaging the meter. The imaging device transmits the acquired image to the processing device 10. Or, the imaging device may store the image in the memory device 20. The processing device 10 acquires the image by accessing the memory device 20. A video image may be imaged by the imaging device. For example, the imaging device cuts out a static image from the video image and transmits the static image to the processing device 10 or the memory device 20. An object other than the meter may be imaged in the image.

Figure 3A:
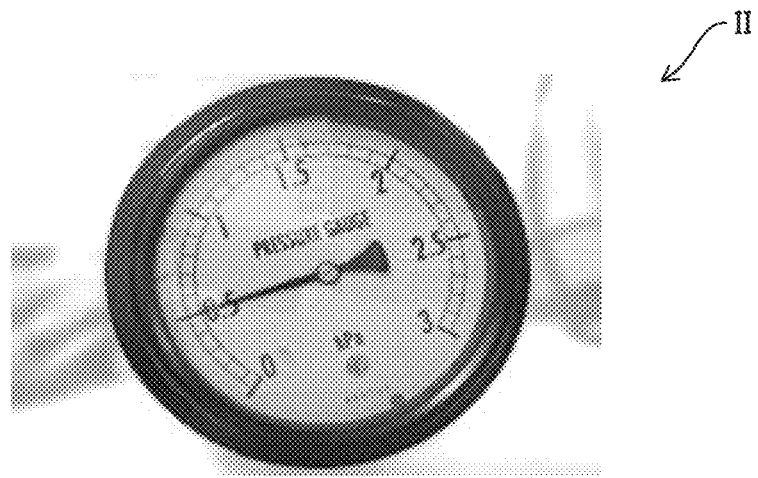

The acceptor 11 accepts the image input to the processing device 10. The acceptor 11 outputs the image to the extractor 12. FIG. 3A is an example of the image input to the processing device 10.

From the input image, the extractor 12 extracts a candidate of the region in which the meter is imaged. Here, the image that is imaged by the imaging device and input to the processing device 10 is called the input image. A portion of the input image that is a candidate of the region in which the meter is imaged is called a candidate region. Multiple candidate regions may be output from the extractor 12.

As one specific example, the extractor 12 includes a contour extractor 12a and a selector 12b.

For example, the contour extractor 12a extracts contours (edges) included in the input image based on the brightness difference or the luminance difference of the input image. The contour extractor 12a also may perform processing of the input image as appropriate when extracting the contours. For example, the contour extractor 12a may convert the input image into grayscale, subsequently binarize the image, and extract the contours from the binary image.

Figure 3B:
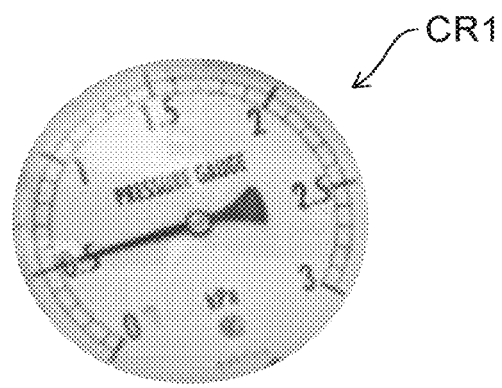

The selector 12b extracts a region surrounded with a contour from the input image. For example, the selector 12b compares the maximum length in some one direction and the surface area to preset thresholds for the regions. The selector 12b selects, as candidate regions, the regions for which the maximum length and the surface area are respectively greater than the thresholds. Thereby, the regions that have surface areas that are too small, regions having shapes much different from a meter, etc., are excluded. FIG. 3B illustrates a candidate region CR1 extracted from an input image II illustrated in FIG. 3A. The selector 12b outputs the candidate region to the corrector 13.

The corrector 13 performs a projective transformation of the candidate region as appropriate. Typically, the outer edge of the meter or the outer edge of the display panel of the meter is circular or rectangular. When the candidate region is trapezoidal, parallelogram-shaped, etc., the corrector 13 performs a projective transformation of the candidate region so that the outer edge of the candidate region is rectangular. When the candidate region is elliptical or oval, the corrector 13 performs a projective transformation of the candidate region so that the outer edge of the candidate region is circular. The distortion of the candidate region is corrected by the projective transformation. The corrector 13 outputs the corrected candidate region to the extractor 14.

The extractor 14 extracts a numeral region, a scale region, and a pointer region from the candidate region. Specifically, the extractor 14 includes a numeral region extractor 14a, a type determiner 14b, a scale region extractor 14c, and a pointer region extractor 14d.

The numeral region extractor 14a extracts a character candidate, which is a candidate of a region in which a character is imaged, from the candidate region. The character candidate is a portion of the candidate region. The character candidate includes a numeral, an alphabet character, etc. Or, an object other than a character such as adhered matter on the meter, noise of the image, etc., may be included in the character candidate. For example, scene character recognition technology or the like is used to extract the character candidate. The size of the extracted character candidate is determined based on the size of the candidate region.

The numeral region extractor 14a performs the following processing for each of the character candidates.

First, the numeral region extractor 14a calculates a match rate between the character candidate and a numeral for each of the character candidates. For example, the numeral region extractor 14a calculates, as the match rate, the similarity of a feature between the character candidate and a preregistered image of a numeral. Then, the numeral region extractor 14a performs a preset angular rotation of the character candidate. The numeral region extractor 14a recalculates the match rate between the character candidate and the numeral for each of the rotated character candidates. Thereafter, the rotation of the character candidate and the calculation of the match rate are repeated until the rotation count reaches a prescribed number or the total rotation angle reaches a prescribed threshold.

Figure 4A:
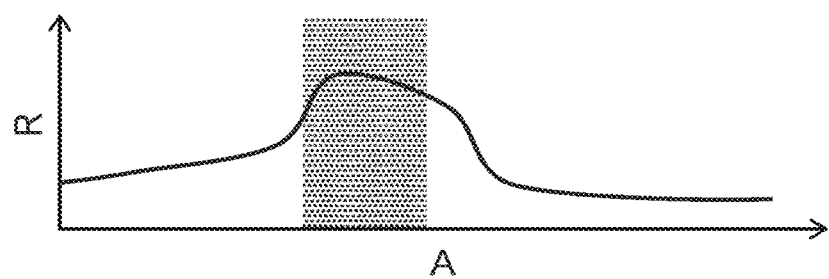
Figure 4B:
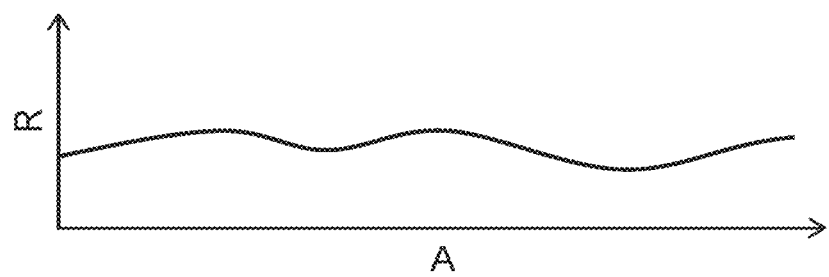

In FIGS. 4A and 4B, the horizontal axis is a rotation angle A. The vertical axis is a match rate R. Results such as those illustrated in FIGS. 4A and 4B are obtained by repeating the rotation of the character candidate and the calculation of the match rate.

FIG. 4A illustrates a result when a numeral is included in the character candidate. The numeral region extractor 14a calculates the proportion of the change of the match rate with respect to the change of the rotation angle from the result. For example, the numeral region extractor 14a determines that a numeral is included in the character candidate when the proportion is greater than a threshold. In the example of FIG. 4A, the numeral region extractor 14a determines that a numeral is included in the character candidate from the result of the cross-hatched portion.

FIG. 4B illustrates a result when a numeral is not included in the character candidate. When a numeral is not included in the character candidate, the proportion of the change of the match rate with respect to the change of the rotation angle is small as illustrated in FIG. 4B. Based on this result, the numeral region extractor 14a excludes the character candidates that do not include a numeral from the multiple character candidates. The numeral region extractor 14a determines the minimum area surrounding the character candidate for each of the character candidates determined to include a numeral.

The numeral region extractor 14a may rotate the candidate region based on the result of the rotation angle and the match rate. For example, when a numeral is determined to be included in the character candidate, the numeral region extractor 14a records the angle at which the maximum value of the match rate is obtained. When the determination is completed for all of the character candidates, the numeral region extractor 14a calculates the average value of the angles. The numeral region extractor 14a rotates the candidate region by the calculated average value.

Figure 3C:
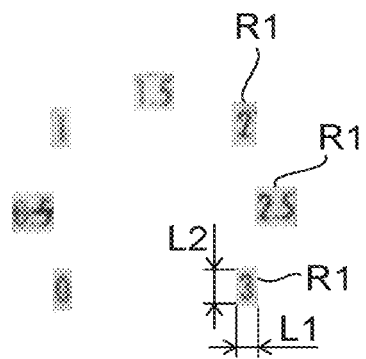

By the processing described above, for example, the minimum areas that surround the numerals are obtained as illustrated in FIG. 3C from the image of the candidate region CR1 illustrated in FIG. 3B. These minimum areas each are extracted as numeral regions R1 from the candidate region CR1. The numeral region extractor 14a outputs, to the type determiner 14b, the extracted multiple numeral regions and the positions of the numeral regions in the candidate region.

At this time, information that relates to the numeral regions may be output from the numeral region extractor 14a to the corrector 13. For example, the numeral region extractor 14a acquires a length L1 and a length L2 for at least a portion of the extracted numeral regions as illustrated in FIG. 3C and outputs the length L1 and the length L2 to the corrector 13. For example, the corrector 13 calculates the distortion of the candidate region based on the ratio of the length L1 and the length L2 and re-performs a projective transformation of the candidate region to correct the distortion. In such a case, the processing by the numeral region extractor 14a is re-performed for the candidate region of the projective transformation. Numeral regions that have less distortion can be extracted thereby. A scale region and a pointer region that have less distortion can be extracted in the subsequent processing. The reading accuracy of the indication of the meter can be increased when the distortions of the numeral region, the scale region, and the pointer region are small.

The type determiner 14b determines the type of the meter imaged in the input image based on the positions of the numeral regions. For example, when the multiple numeral regions R1 are arranged in a curve in the circumferential direction as illustrated in FIG. 3C, the type determiner 14b determines that the meter imaged in the input image is a round meter. When the numerals are arranged along one direction, the type determiner 14b determines that the meter imaged in the input image is a vertical meter or a horizontal meter. The type determiner 14b outputs the type of the meter to the scale region extractor 14c.

The scale region extractor 14c extracts the scale region from the candidate region. For example, the processing by the scale region extractor 14c changes according to the result of the determination by the type determiner 14b. Specifically, when the type of the meter is determined to be round, the scale region extractor 14c performs a polar transformation of the candidate region. For example, when the candidate region is circular, the center of the circle is used as the center of the polar coordinate system. When the candidate region is rectangular, the intersection of the diagonal lines is used as the center of the polar coordinate system. The polar transformation of the candidate region is performed after setting the center of the polar coordinate system.

Figure 5A:
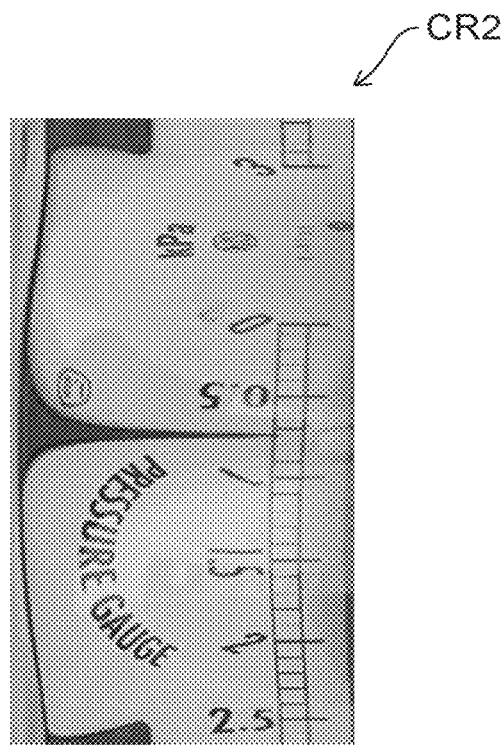

When the meter is round, the graduations are arranged in the circumferential direction in the candidate region. In the candidate region after the polar transformation, the graduations are arranged in substantially one direction. When the type of the meter is vertical or horizontal, a polar transformation of the candidate region is not performed. This is because the graduations are already arranged in one direction in vertical meters and horizontal meters. FIG. 5A illustrates a result of a polar transformation of the candidate region CR1 of FIG. 3B.

Figure 5B:
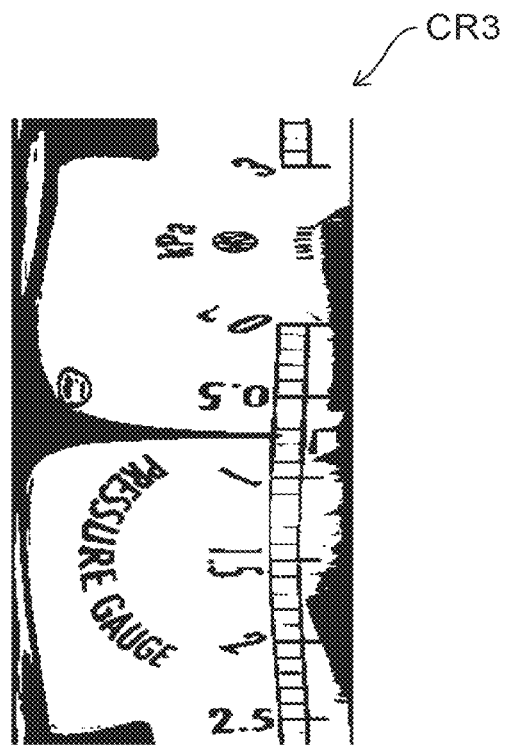
Figure 5C:
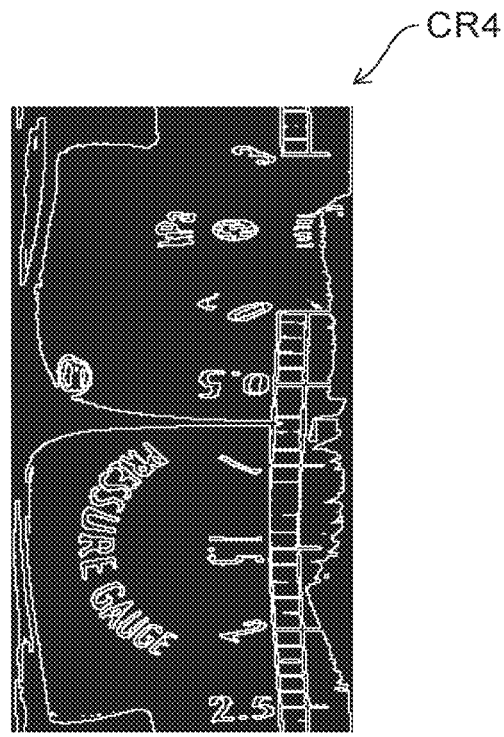

For example, the scale region extractor 14c binarizes a candidate region CR2 after the polar transformation illustrated in FIG. 5A. As illustrated in FIG. 5B, a binarized candidate region CR3 is obtained thereby. The scale region extractor 14c extracts contours from the binarized candidate region CR3. As illustrated in FIG. 5C, a candidate region CR4 in which the contours are enhanced is obtained thereby.

Figure 6A:
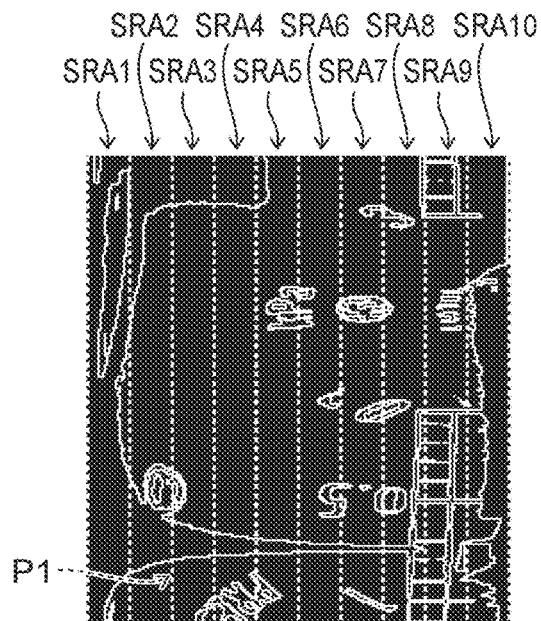

The scale region extractor 14c sets multiple first subregions SRA as illustrated in FIG. 6A for the image in which the contours are extracted. The multiple first subregions SRA are arranged in a first direction D1. The length of the first subregion SRA in a second direction D2 perpendicular to the first direction D1 is, for example, equal to the length in the second direction D2 of the candidate region CR4. For example, the number of the first subregions SRA that are set is determined based on the size of the candidate region. In the example of FIG. 6A, ten first subregions SRA1 to SRA10 are set.

When the meter is round, the first direction D1 corresponds to the diametrical direction before the polar transformation. The diametrical direction is the direction from the center of rotation of the meter or the graduation toward the graduations. The second direction D2 corresponds to the circumferential direction. The circumferential direction is the direction in which the graduations are arranged. The scale region extractor 14c counts the number of horizontal lines in each of the first subregions SRA. Here, a horizontal line refers to a line extending in the first direction D1.

Figures 6B, 6C:
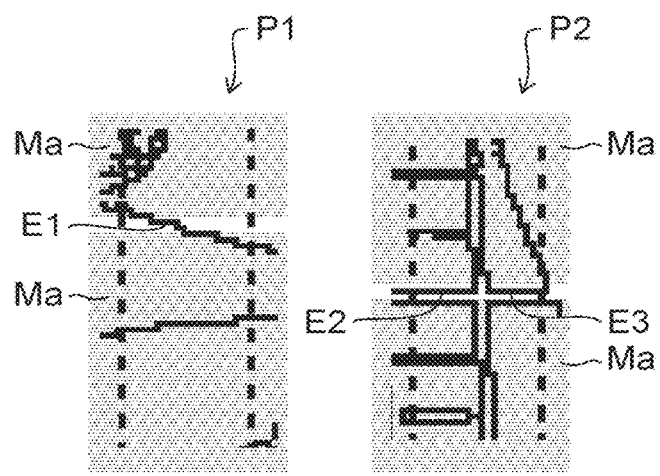

FIG. 6B is an enlarged image of a portion P1 illustrated in FIG. 6A. FIG. 6C is an enlarged image of a portion P2 illustrated in FIG. 6A. Here, the black and white of the image of FIG. 6A are inverted for convenience of description in FIGS. 6B and 6C. For example, as illustrated in FIGS. 6B and 6C, the scale region extractor 14c sets masks Ma in each of the first subregions SRA. For example, the masks Ma are set so that the length in the second direction D2 of the regions not covered with the masks Ma has a specified value. The scale region extractor 14c confirms whether or not contours are in the regions not covered with the masks Ma. When a contour exists, the scale region extractor 14c measures the length in the first direction D1 of the contour. When the length in the first direction D1 is greater than a prescribed threshold, the contour is determined to be a horizontal line. For example, in the example illustrated in FIG. 6B, a contour E1 between the masks Ma is not determined to be a horizontal line. In the example illustrated in FIG. 6C, contours E2 and E3 between the masks Ma are determined to be horizontal lines. The scale region extractor 14c counts the number of horizontal lines in each of the first subregions SRA while changing the positions of the masks Ma.

Figure 6D:
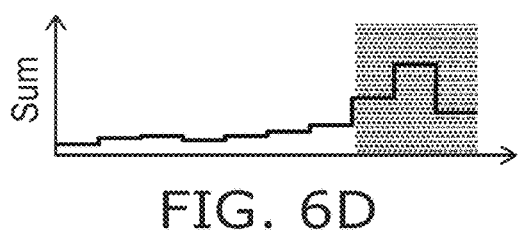

The scale region extractor 14c totals the number of horizontal lines in each of the first subregions SRA. For example, the result illustrated in FIG. 6D is obtained from the image illustrated in FIG. 6A. FIG. 6D illustrates a total Sum of the number of horizontal lines at each of multiple points in the first direction D1. From this result, the scale region extractor 14c determines the first subregions in which the total numbers of the horizontal lines are greater than the prescribed threshold to be areas (scale areas) in which the graduations of the meter exist. In the example of FIG. 6D, the scale region extractor 14c determines the positions of the first subregions SRA8 to SRA10 shown by cross hatching to be the scale area. The scale region extractor 14c extracts the scale area from the candidate region based on the determination result. For example, by this processing, a scale area SA illustrated in FIG. 7A is extracted from the image illustrated in FIG. 5A.

Figures 7A, 7B, 7C:
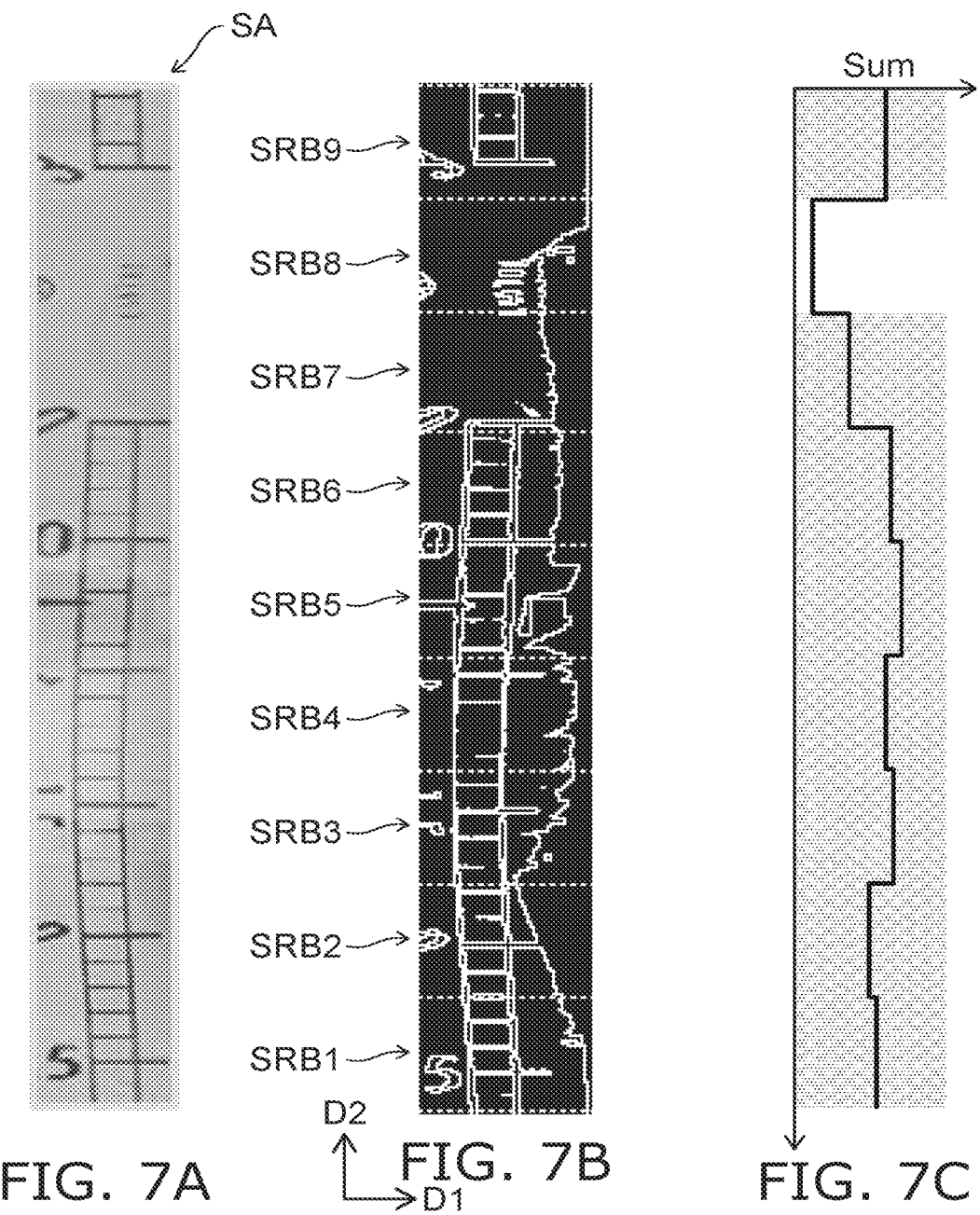

For example, as illustrated in FIG. 7B, the scale region extractor 14c sets multiple second subregions SRB in the scale area SA in which the contours are extracted. The multiple second subregions SRB are arranged in the second direction D2. In the example of FIG. 7B, nine second subregions SRB1 to SRB9 are set. Similarly to the totaling calculation of the number of horizontal lines of each of the first subregions SRA described above, the scale region extractor 14c totals the number of horizontal lines for each of the second subregions SRB.

For example, the result illustrated in FIG. 7C is obtained from the image illustrated in FIG. 7B. FIG. 7C illustrates the total Sum of the number of horizontal lines for each of the second subregions SRB. From this result, the scale region extractor 14c determines the second subregions in which the total numbers of the horizontal lines are greater than the threshold to be regions (scale regions) in which graduations of the meter exist. In the example of FIG. 7C, the scale region extractor 14c determines the positions of the second subregions SRB1 to SRB6 and SRB9 shown by cross hatching to be the scale region of the meter. The scale region extractor 14c extracts the scale region from the scale area based on this result.

Figure 7D:
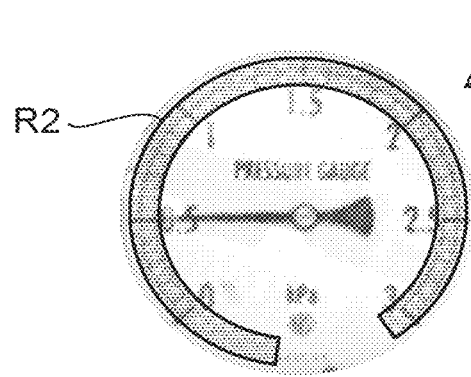

By the processing described above, the region of the candidate region in which the graduations exist is designated. The scale region extractor 14c extracts the scale region from the candidate region based on this result. For example, as illustrated in FIG. 7D, a scale region R2 is extracted from the candidate region CR1 rotated by the numeral region extractor 14a. The scale region extractor 14c outputs the extracted scale region to the pointer region extractor 14d.

In the case where a polar transformation of the candidate region has been performed, the scale region extractor 14c also may perform the following processing.

Figure 8:
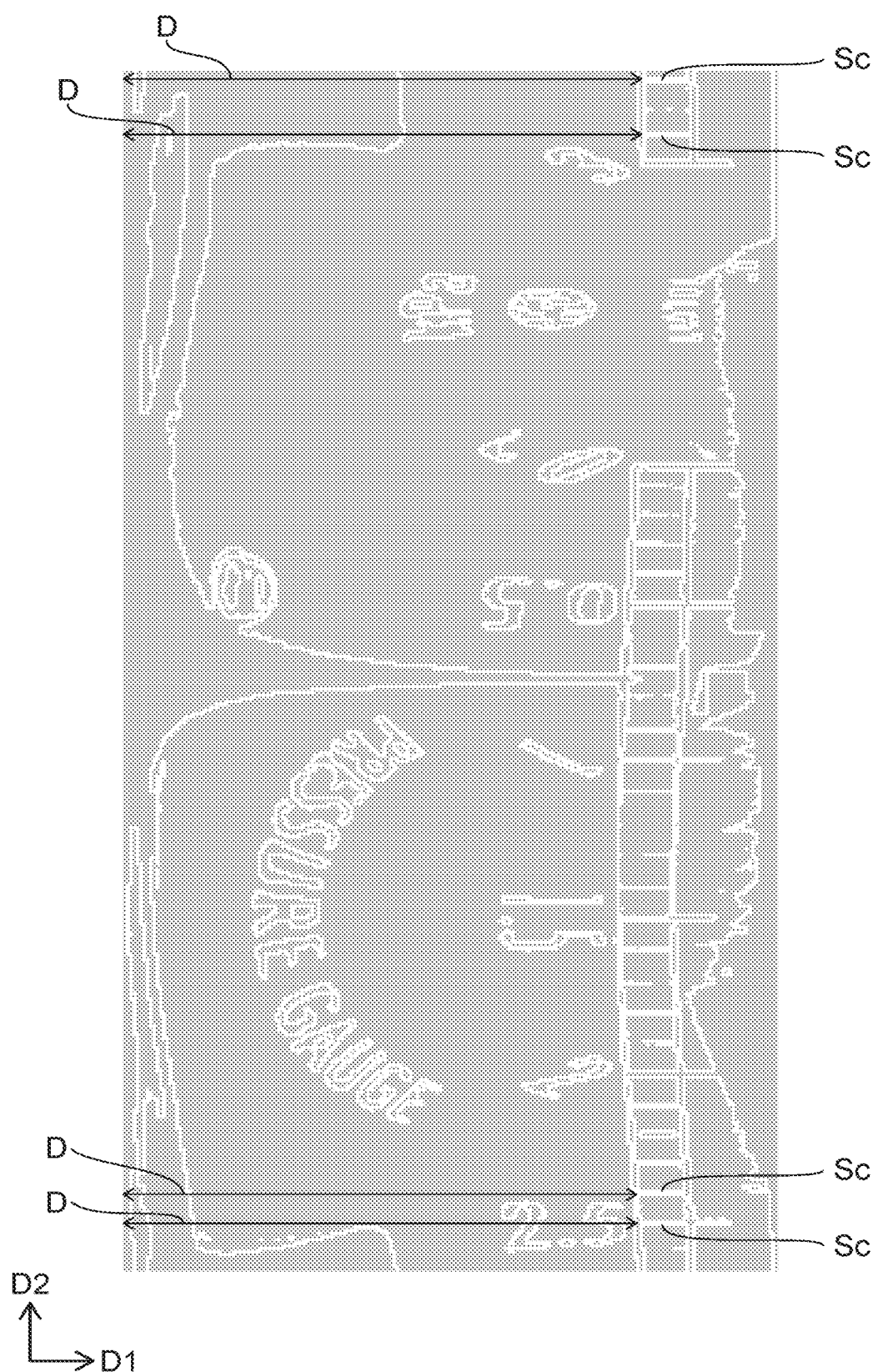

The scale region extractor 14c extracts the graduations from the scale region. For example, the scale region extractor 14c identifies the horizontal lines arranged in the second direction D2 in the scale region to be graduations. As illustrated in FIG. 8, the scale region extractor 14c calculates a distance D between the graduation Sc and the first direction D1 end portion of the candidate region after the polar transformation for each of the graduations Sc. The distances are substantially equal when the center of the polar coordinate system matches the center of the actual round meter.

Fluctuation of the distance indicates that the center of the polar coordinate system does not match the center of the actual round meter.

For example, the scale region extractor 14c acquires the maximum value of the distances, the minimum value of the distances, the position of the horizontal line at which the distance is the maximum, and the position of the horizontal line at which the distance is the minimum. At the position at which the distance is the minimum, the center of the actual round meter is more distant in the first direction D1 than the center of the polar coordinate system. At the position at which the distance is the maximum, the center of the actual round meter is more proximate in the first direction D1 than the center of the polar coordinate system. Based on such information, the scale region extractor 14c corrects the center of the polar coordinate system and re-performs a polar transformation of the candidate region. The scale region extractor 14c re-extracts the scale region for the candidate region of the new polar transformation. The scale region can be more accurately extracted thereby. The reading accuracy of the indication of the meter can be increased.

The processing of the scale region extractor 14c described in FIGS. 5A to 8 is for a round meter. Processing similar to that described above is performed even when the meter is vertical or horizontal. In other words, the scale region extractor 14c sets the multiple first subregions for a candidate region in which the graduations are arranged in one direction. The scale region extractor 14c extracts the scale area from the candidate region based on the total number of the horizontal lines for each of the first subregions. The scale region extractor 14c sets the multiple second subregions for the scale area. The scale region extractor 14c extracts the scale region from the scale area based on the total number of the horizontal lines for each of the second subregions.

The pointer region extractor 14d sets a detection region for detecting the pointer in the candidate region. When the meter is determined to be round by the type determiner 14b, the pointer region extractor 14d sets a circular pointer region. When the meter is determined to be vertical or horizontal, the pointer region extractor 14d sets a rectangular pointer region. The pointer region extractor 14d determines the position of the pointer based on information obtained from the detection region. The pointer region extractor 14d extracts the pointer region based on the determination result of the pointer position in the detection regions while changing the size of the detection region.

An example of the processing by the pointer region extractor 14d when the meter is round will now be described.

Figure 9A:
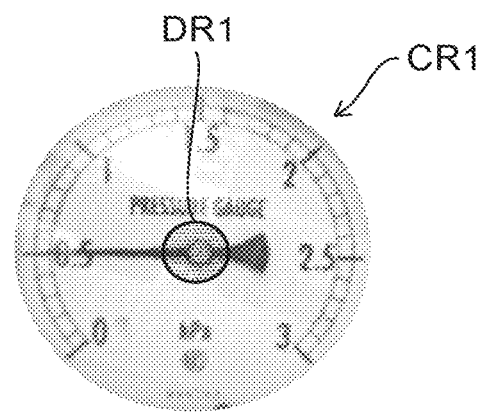
Figures 9B, 9C:
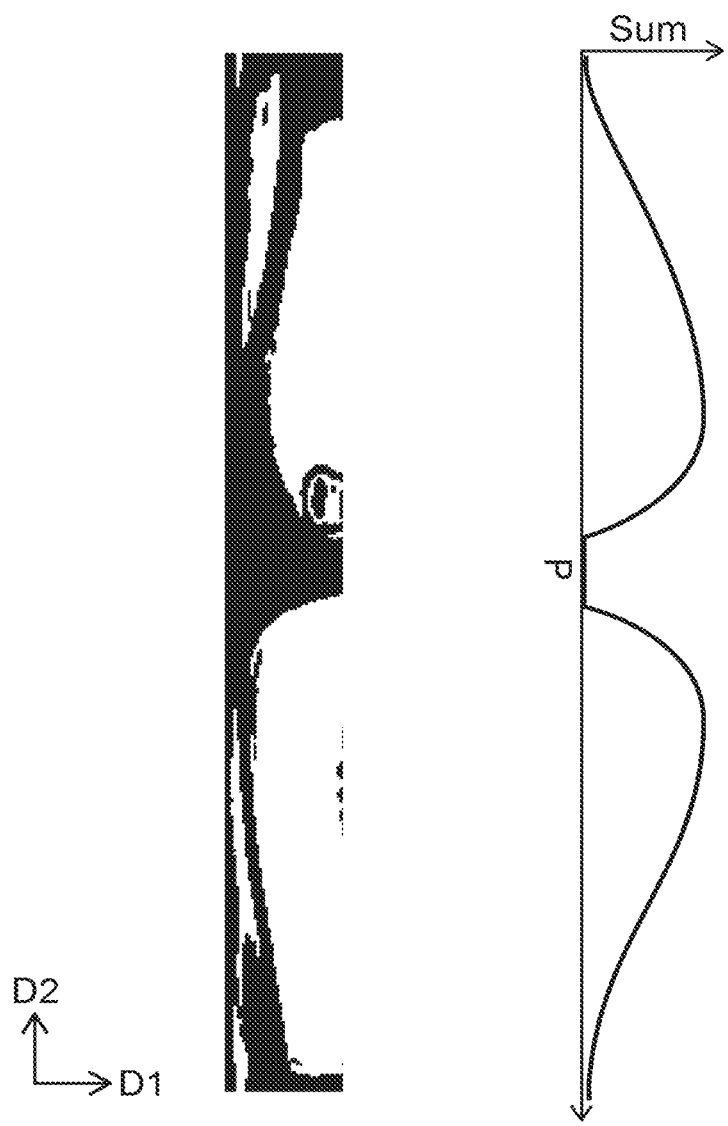

First, the pointer region extractor 14d sets a circular detection region. The center of the detection region is set to the center of the candidate region. First, the diameter of the circle of the detection region is set to a predetermined value. The pointer region extractor 14d performs a polar transformation of the detection region. For example, as illustrated in FIG. 9A, a circular detection region DR1 is set in the candidate region. FIG. 9B illustrates the result of performing the polar transformation of the detection region DR1 illustrated in FIG. 9A and binarizing. The pointer region extractor 14d calculates the total of the luminances of the multiple pixels arranged in the first direction D1 at each of multiple points in the second direction D2 for the detection region of the polar transformation. By performing this processing for the binarized detection region, the number of white pixels arranged in the first direction D1 is calculated at each of the multiple points in the second direction D2. FIG. 9C illustrates the relationship between the position P in the second direction D2 and the total Sum of the luminances for the detection region illustrated in FIG. 9B. For example, the pointer region extractor 14d determines that the pointer exists at the second direction D2 position at which the total of the luminances is a minimum. When the minimum values of the totals of the luminances are the same at multiple points, the pointer region extractor 14d compares a distribution range threshold and the distribution range of the positions at which the luminances are minimum values. When the distribution range is not more than the distribution range threshold, the pointer region extractor 14d uses the average position as the position of the pointer. As an example, the second direction D2 distance that corresponds to an angle of 10 degrees in the polar coordinate system is set as the distribution range threshold. The pointer region extractor 14d determines the position of the pointer to be undetected when the distribution range is greater than the distribution range threshold.

Figure 10A:
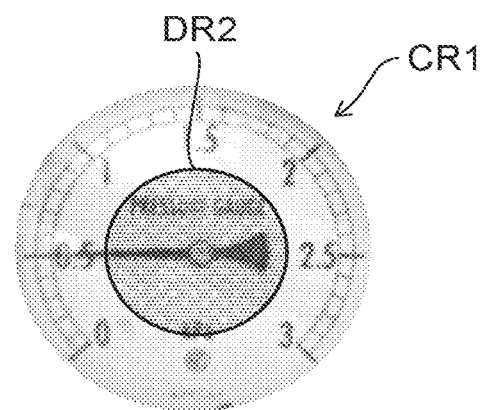
Figures 10B, 10C:
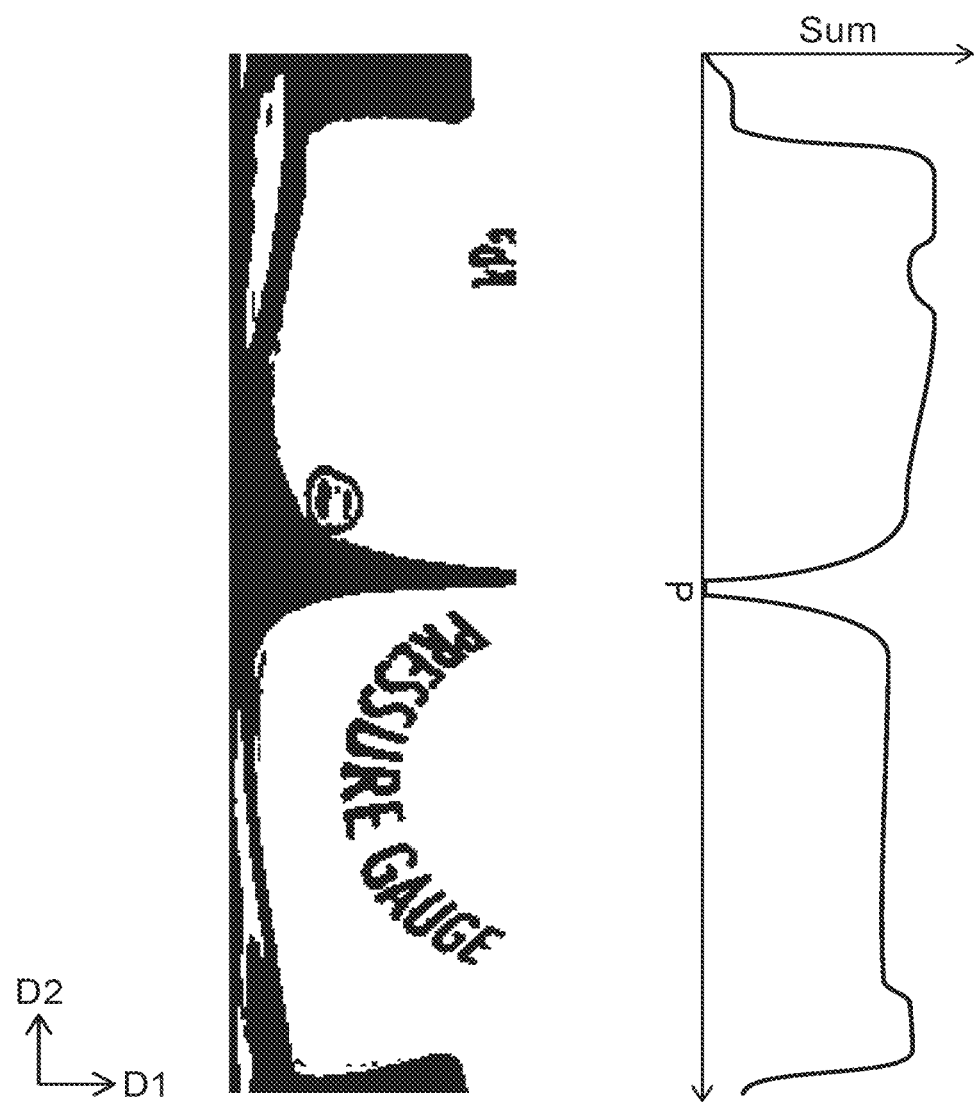

When the pointer position is determined in the detection region that is set, the pointer region extractor 14d changes the size of the detection region. For example, when a small detection region is set first, the pointer region extractor 14d increases the detection region. FIG. 10A illustrates another example of the detection region. The diameter of a detection region DR2 illustrated in FIG. 10A is greater than the diameter of the detection region DR1 illustrated in FIG. 9A. FIG. 10B illustrates a result of performing a polar transformation of the detection region DR2 illustrated in FIG. 10A and binarizing. Similarly for the detection region DR2 illustrated in FIG. 10B, the pointer region extractor 14d calculates the total of the luminances of the multiple pixels arranged in the first direction D1 at each of multiple points in the second direction D2. FIG. 10C illustrates the relationship between the position P in the second direction D2 and the total Sum of the luminances for the detection region illustrated in FIG. 10B.

The pointer region extractor 14d repeats the modification of the size of the detection region and the determination of the pointer position in the detection region described above. This processing is repeated until the size of the detection region satisfies a prescribed condition. For example, this processing is repeated until the detection region reaches the scale region. In a typical round meter, at least a portion of the pointer exists inward of the scale region. If the detection region reaches the scale region, at least a portion of the pointer exists inside the detection region. Or, the processing described above may be repeated until the size of the detection region reaches a designated value calculated based on the size of the candidate region.

Figure 11:
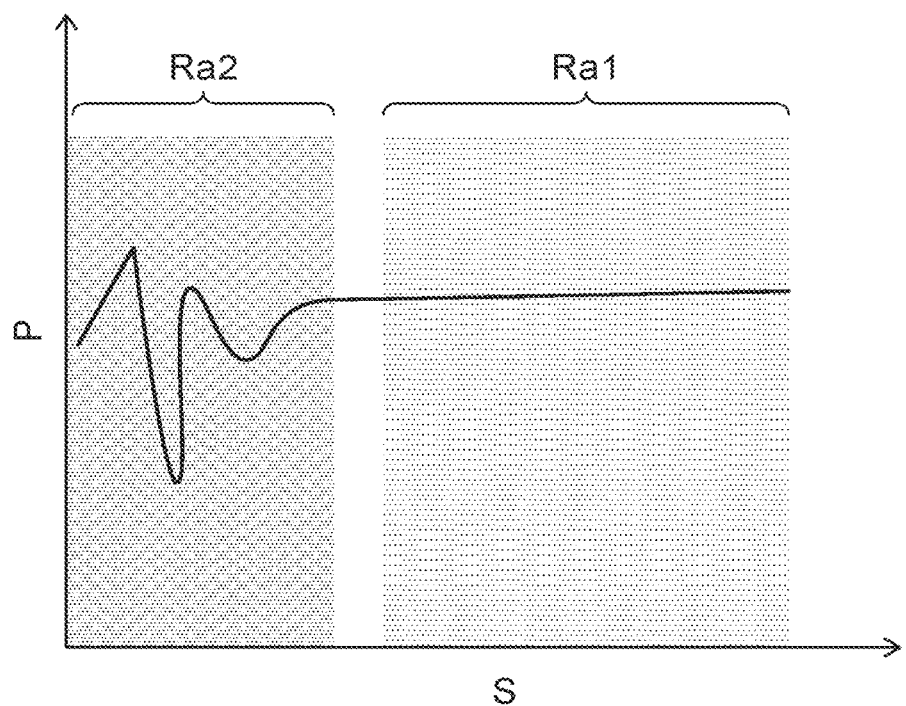

FIG. 11 illustrates a result obtained by repeating the modification of the size of the detection region and the determination of the pointer position in the detection region. In FIG. 11, the horizontal axis is a size S of the detection region, and the vertical axis is the position P of the pointer in the second direction D2. When the meter is round, the size of the detection region corresponds to the diameter (the radius or the diameter). The position in the second direction D2 corresponds to the angle.

From the result of the change of the size of the detection region and the pointer position, the pointer region extractor 14d determines a first range and a second range for the size of the detection region. The change of the pointer position is small when the size is within the first range. The change of the pointer position is large when the size is within the second range. For example, the pointer region extractor 14d calculates the proportion of the change of the pointer position with respect to the change of the size at each of multiple points of the horizontal axis for the graph illustrated in FIG. 11. The pointer region extractor 14d extracts, as the first range, a continuous portion in which the proportion is not more than the first threshold. The pointer region extractor 14d extracts, as the second range, a continuous portion in which the proportion is greater than the second threshold. The second threshold is greater than the first threshold.

FIG. 11 illustrates an example of a first range Ra1 and a second range Ra2. Typically, in a round meter, one end of the pointer is proximate to the graduations, and the other end of the pointer protrudes to the opposite side of the center of rotation. When the detection region is small as illustrated in FIGS. 9B and 9C, the total value of the luminances is large at both the position at which the one end of the pointer exists and the position at which the other end exists. Therefore, it is not easy to identify the one end of the pointer with high accuracy. As a result, the change of the pointer position is large as in the second range Ra2 illustrated in FIG. 11. On the other hand, when the detection region is large as illustrated in FIGS. 10B and 10C, the total of the luminances at the position at which the one end of the pointer exists is greater than the total of the luminances at the position at which the other end exists. Thereby, the one end of the pointer can be discriminated from the other end, and the change of the pointer position is reduced.

Figure 12:
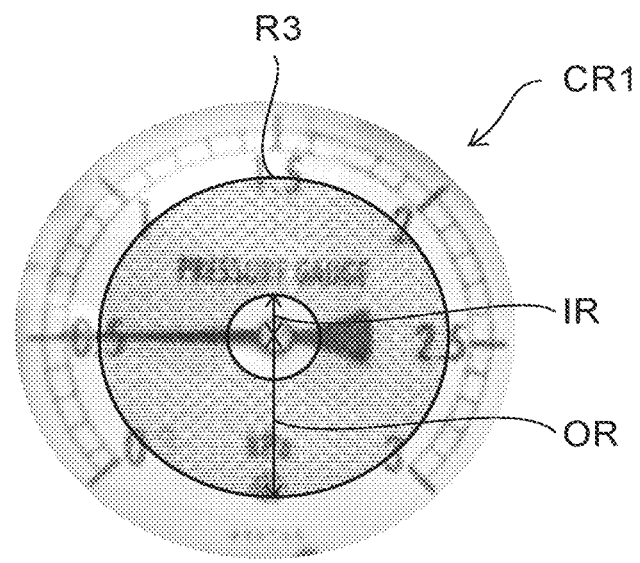

The pointer region extractor 14d determines the size of the pointer region based on the upper limit of the size (the diameter) of the first range. Also, the pointer region extractor 14d may determine the size of the pointer region based on the upper limit of the size in the second range or the lower limit of the size (the diameter) in the first range. For example, when the meter is round, a circular-ring shaped pointer region R3 is extracted as illustrated in FIG. 12. An inner diameter IR of the pointer region R3 is set based on the upper limit of the size in the second range or the lower limit of the size in the first range. An outer diameter OR of the pointer region R3 is set based on the upper limit of the length in the first range. Namely, the pointer region is set so that the length does not include a detection region within the second range. The accuracy of the reading of the indication can be increased thereby.

By the processing described above, the numeral region, the scale region, and the pointer region are extracted from the candidate region. The extractor 14 outputs the extracted regions to the reader 15.

The reader 15 reads the indication of the meter by using the numeral region, the scale region, and the pointer region extracted by the extractor 14.

Specifically, the reader 15 includes a graduation recognizer 15a, a numeral recognizer 15b, a pointer recognizer 15c, a graduation joiner 15d, and a calculator 15e.

The graduation recognizer 15a recognizes the graduations of the meter based on the luminance difference in the scale region extracted by the extractor 14. For example, the graduation recognizer 15a sets a reference line and calculates the angles between the reference line and the graduations.

The numeral recognizer 15b recognizes a numeral in the numeral region extracted by the extractor 14. The pointer recognizer 15c detects the angle between the reference line and the pointer based on information of the pointer region extracted by the extractor 14.

The graduation joiner 15d associates the graduations recognized by the graduation recognizer 15a and the numerals recognized by the numeral recognizer 15b. The calculator 15e calculates the indication of the meter based on the angles of the graduations, correspondence information between the graduations and the numerals, and the angle of the pointer. The reader 15 transmits the calculated indication to the outputter 16.

For example, the outputter 16 outputs information based on the calculated indication to an external output device. For example, the information includes the indication that is read. The information may include a result calculated based on the indication that is read. The outputter 16 may calculate another value based on the multiple indications that are read and may output the calculation result. The outputter 16 also may output information such as the time of the reading, etc. Or, the outputter 16 may output a file including the information such as the indication numeral that is read, the time of the reading, etc., in a prescribed format such as CSV, etc. The outputter 16 may transmit the data to an external server by using FTP (File Transfer Protocol), etc. Or, the outputter 16 may insert the data into an external database server by performing database communication and using ODBC (Open Database Connectivity), etc.

The processing device 10 includes, for example, a processing circuit made of a central processing unit. The memory device 20 includes, for example, at least one of a hard disk drive (HDD), a network-attached hard disk (NAS), an embedded multimedia card (eMMC), a solid-state drive (SSD), or a solid-state hybrid drive (SSHD). The processing device 10 and the memory device 20 are connected by a wired or wireless technique. Or, the processing device 10 and the memory device 20 may be connected to each other via a network.

FIGS. 13 to 16 are flowcharts illustrating the processing according to the reading support system according to the first embodiment.

Figure 13:
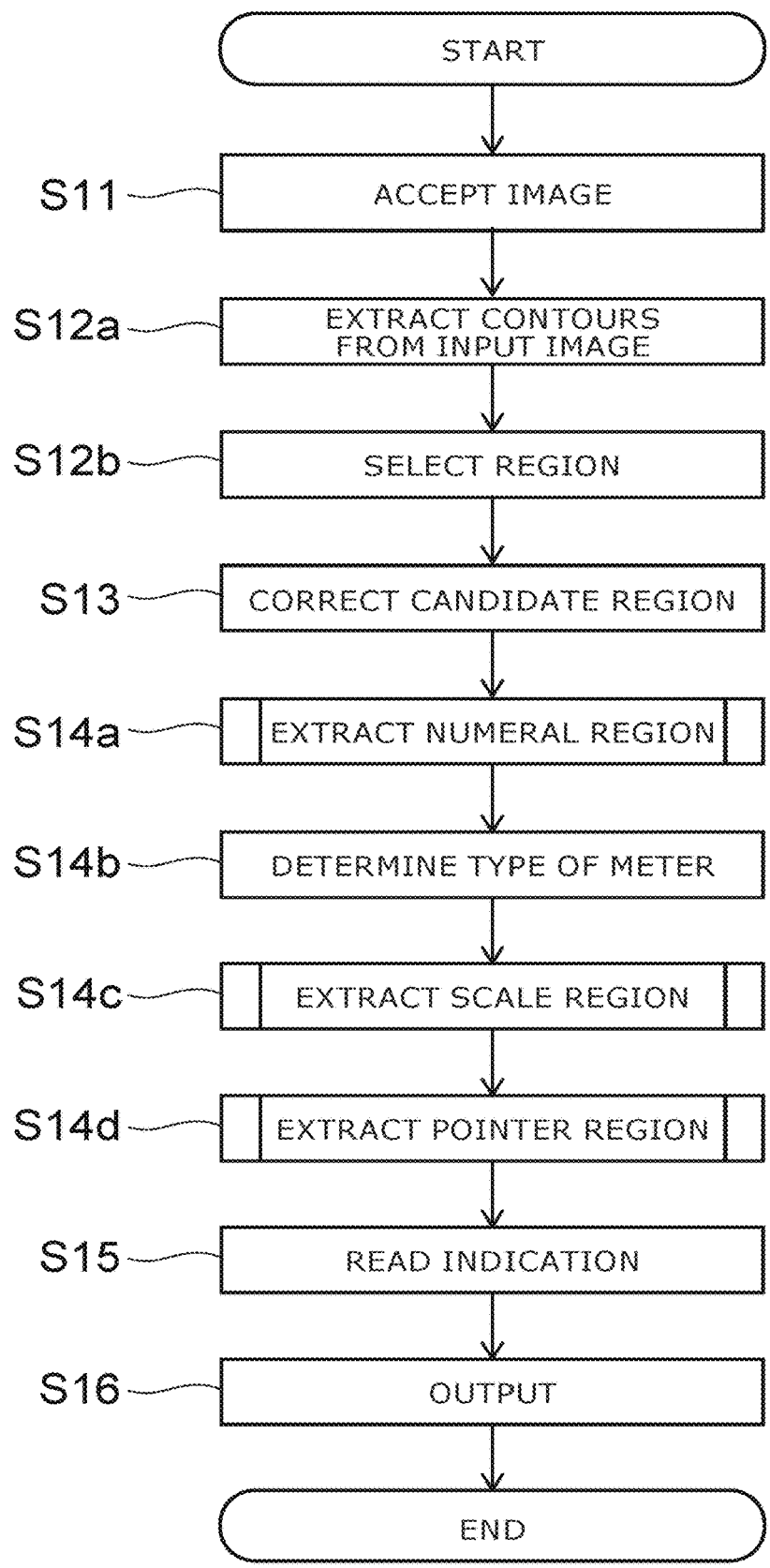
FIGS. 13 to 16 are flowcharts illustrating the processing according to the reading support system according to the first embodiment.

As illustrated in FIG. 13, the acceptor 11 accepts the input image (step S11). The contour extractor 12a extracts contours from the input image (step S12a). The selector 12b selects, as candidate regions, a portion of the regions surrounded with the contours that satisfy a condition (step S12b). The corrector 13 corrects the candidate region by performing a projective transformation (step S13). The numeral region extractor 14a extracts multiple numeral regions from the candidate region (step S14a). The type determiner 14b determines the type of the meter based on the positions of the multiple numeral regions (step S14b). The scale region extractor 14c extracts the scale region from the candidate region (step S14c). The pointer region extractor 14d extracts the pointer region from the candidate region (step S14d). The reader 15 reads the indication of the pointer (step S15). The outputter 16 outputs information based on the reading result (step S16).

Figure 14:
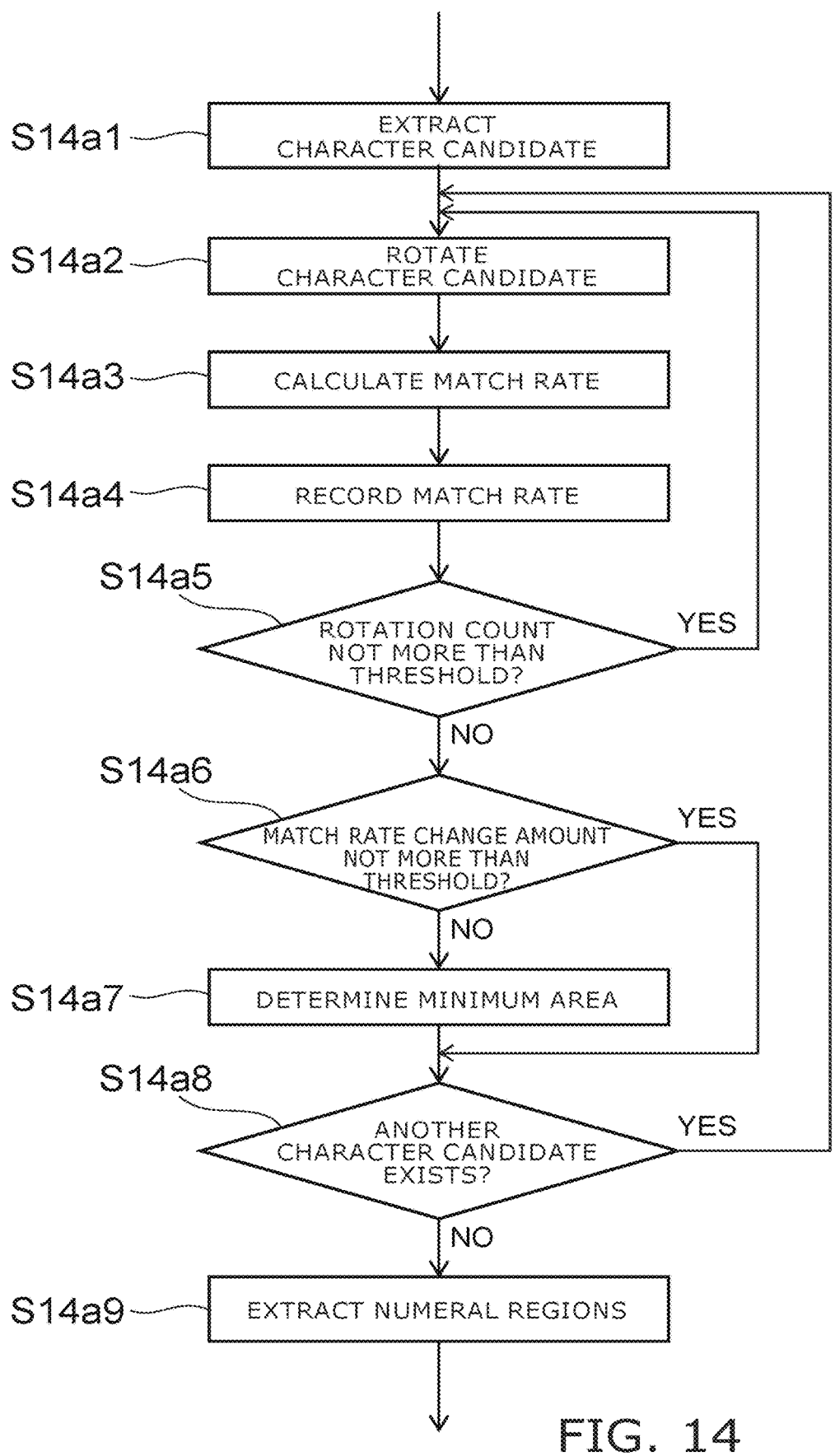

FIG. 14 is a flowchart specifically illustrating the processing of step S14a performed by the numeral region extractor 14a. The numeral region extractor 14a extracts character candidates from the candidate region (step S14a1). The numeral region extractor 14a rotates one of the multiple character candidates (step S14a2). The numeral region extractor 14a calculates a match rate for the rotated character candidate (step S14a3). The numeral region extractor 14a records the calculated match rate (step S14a4). The numeral region extractor 14a determines whether or not the rotation count of the character candidate is not more than a threshold (step S14a5). Steps S14a2 to S14a4 are repeated when the rotation count is not more than the threshold. When the rotation count is greater than the threshold, the numeral region extractor 14a determines whether or not the change amount of the match rate is not more than a threshold (step S14a6). The flow proceeds to step S14a8 when the change amount of the match rate is not more than the threshold.

When the change amount of the match rate is greater than the threshold, the numeral region extractor 14a determines a minimum area surrounding the numeral included in the character candidate (step S14a7). The numeral region extractor 14a determines whether or not there is another character candidate for which the numeral recognition has not been tried (step S14a8). When there is another character candidate, the numeral region extractor 14a performs step S14a2 for the other character candidate. When there is no other character candidate, the numeral region extractor 14a extracts the minimum areas determined up to that point as the numeral regions from the candidate region (step S14a9).

Figure 15:
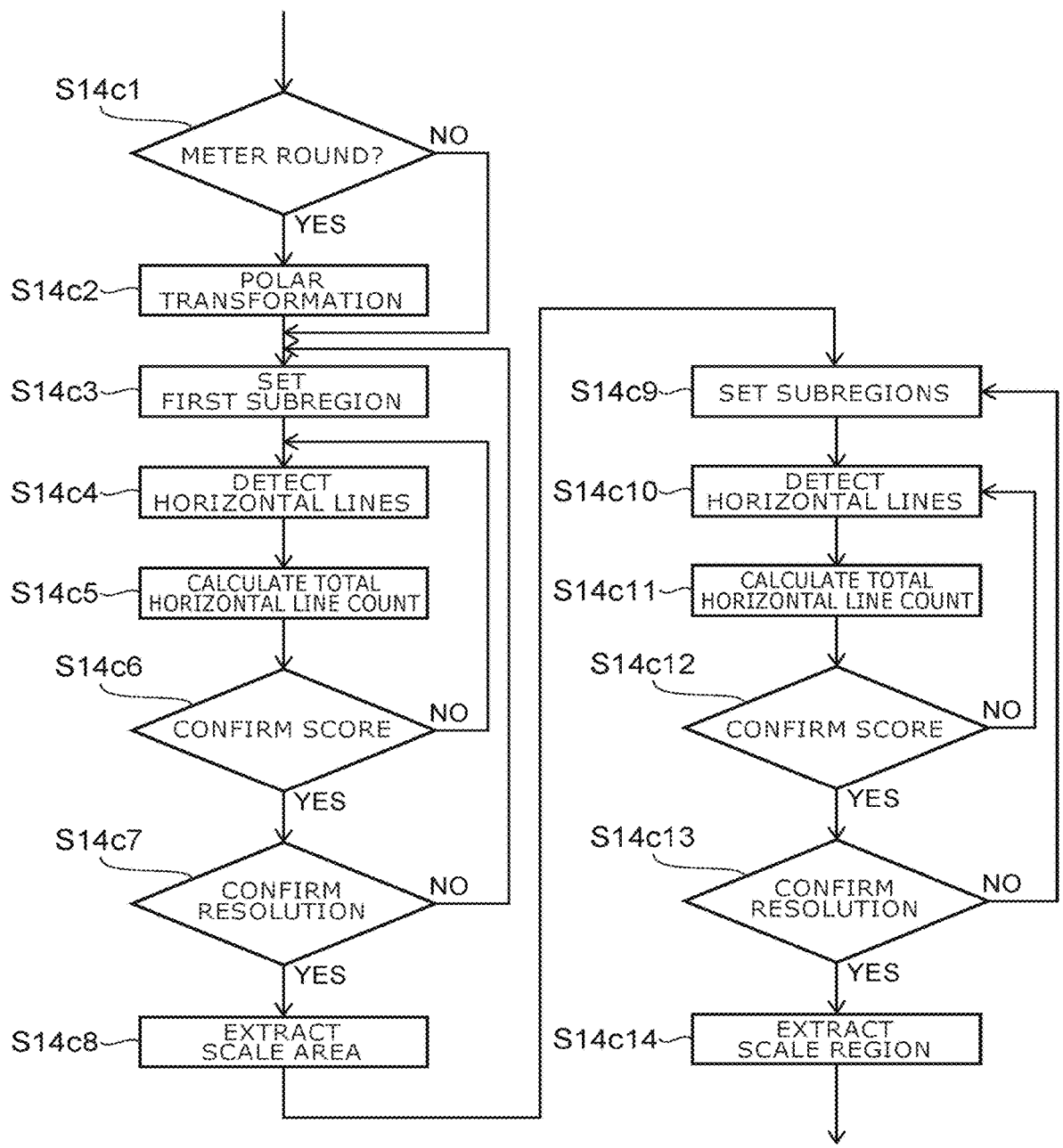

FIG. 15 is a flowchart specifically illustrating the processing of step S14c performed by the scale region extractor 14c. The scale region extractor 14c refers to the type of the meter determined by the type determiner 14b and determines whether or not the meter is round (step S14c1). The flow proceeds to step S14c3 when the meter is not round. When the meter is round, the scale region extractor 14c performs a polar transformation of the candidate region (step S14c2). The scale region extractor 14c sets multiple subregion columns for the candidate region (step S14c3). The scale region extractor 14c detects horizontal lines included in the candidate region (step S14c4). The scale region extractor 14c calculates the total of the numbers of horizontal lines in the subregion columns (step S14c5). The scale region extractor 14c may perform steps 14c6 and S14c7. The scale region extractor 14c uses the maximum value of the totals of the numbers of horizontal lines as a score, and determines whether or not the score is greater than a threshold (step S14c7). When the score is not more than the threshold, there is a possibility that the horizontal lines cannot be appropriately detected. The scale region extractor 14c modifies the detection condition of the horizontal lines and re-performs step S14c4.

When the score is greater than the threshold, the scale region extractor 14c determines whether or not the resolution is not more than a threshold (step S14c8). For example, the resolution is represented by the proportion of the size of one first subregion to the size of the entire extraction region. When the resolution is greater than the threshold, the scale region extractor 14c modifies the setting condition of the first subregion and re-performs step S14c3. When the resolution is not more than the threshold, the scale region extractor 14c extracts the scale area from the candidate region based on the total of the numbers of horizontal lines in each of the first subregions (step S14c8).

The scale region extractor 14c sets multiple second subregions for the scale area (step S14c9). The scale region extractor 14c detects horizontal lines included in the scale area (step S14c10). The scale region extractor 14c calculates the total of the numbers of horizontal lines in the second subregion (step S14c11). The scale region extractor 14c may perform steps S14c12 and S14c13. The scale region extractor 14c uses the maximum value of the totals of the numbers of horizontal lines as a score, and determines whether or not the score is greater than a threshold (step S14c12). When the score is not more than the threshold, there is a possibility that the horizontal lines cannot be appropriately detected. The scale region extractor 14c modifies the detection condition of the horizontal lines and re-performs step S14c10. When the score is greater than the threshold, the scale region extractor 14c determines whether or not the resolution is not more than the threshold (step S14c13). When the resolution is greater than the threshold, the scale region extractor 14c modifies the setting condition of the second subregion and re-performs step S14c9. When the resolution is not more than the threshold, the scale region extractor 14c extracts the scale region from the scale area based on the total of the numbers of horizontal lines in each of the second subregions (step S14c14).

Figure 16:
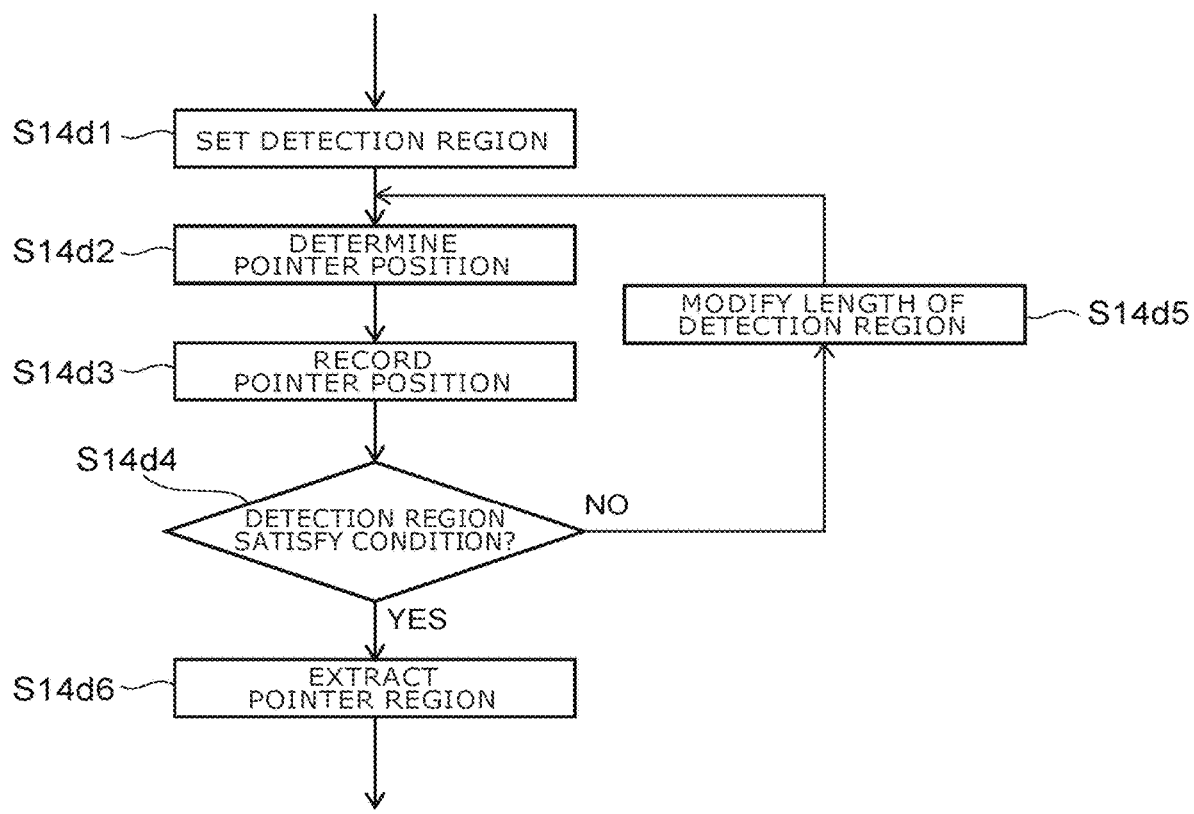

FIG. 16 is a flowchart specifically illustrating the processing of step S14d performed by the pointer region extractor 14d. The pointer region extractor 14d sets a detection region in the candidate region (step S14d1). The pointer region extractor 14d determines the position of the pointer in the detection region that is set (step S14d2). The pointer region extractor 14d records the determined position of the pointer (step S14d3). The pointer region extractor 14d determines whether or not the detection region satisfies a condition (step S14d4). For example, the pointer region extractor 14d determines whether or not the detection region reaches (overlaps) the scale region. When the detection region does not satisfy the condition, the pointer region extractor 14d modifies the length in a designated direction of the detection region (step S14d5). The pointer region extractor 14d re-performs step S14d2 based on the detection region having the modified length. When the detection region satisfies the condition, the pointer region extractor 14d extracts the pointer region from the candidate region based on the relationship between the change of the length and the change of the pointer position (step S14d6).

Effects of the first embodiment will now be described.

When reading the indication of the meter from the image, processing that corresponds to the type of the meter is performed on the image. This is because the arrangement of the graduations is different according to the type of the meter as illustrated in FIGS. 2A to 2D. By performing the processing corresponding to the type of the meter, the accuracy of the reading of the indication can be increased.

For example, a method in which the type of the meter to be imaged is preregistered may be considered to perform the processing corresponding to the type of the meter. The processing device 10 determines the processing to be performed by referring to the registered type of the meter. However, in this method, the indication cannot be appropriately read if the type of the meter is not preregistered. When sequentially reading indications from images of multiple mutually-different meters, etc., it is necessary to associate the meters imaged the images and the types of the meters, and a long period of time is necessary for the setting beforehand.

In the reading support system 1 according to the first embodiment, first, the numeral region extractor 14a extracts numeral regions including multiple numerals of the meter from the candidate region. Then, the type determiner 14b determines the type of the meter based on the positions of the multiple numeral regions. In other words, according to the reading support system 1 according to the first embodiment, the type of the meter is determined automatically from the image. By using the reading support system 1, it is unnecessary for the user to preregister the type of the meter for reading the indication.

Other effects of the first embodiment will now be described.

The numeral region, the scale region, and the pointer region are extracted from the candidate region when reading the indication of the meter from the image. Then, the indication of the meter is read based on these extracted regions. At this time, it is desirable for the numeral region, the scale region, or the pointer region to be more appropriately extracted. By more appropriately extracting the numeral region, the scale region, or the pointer region, the indication can be read with higher accuracy.

For example, there is a method in which the position of the meter where the graduations exist is preregistered, and the scale region is extracted from the candidate region based on the registered information and the luminance of the image. However, in this method, the scale region cannot be appropriately extracted when the actual scale region is different from the registered position. When sequentially reading the indications from the images of multiple mutually-different meters, etc., it is necessary to associate the meters of the images and the positions of the graduations in the meters, and a long period of time is necessary for the setting beforehand.

In the reading support system 1 according to the first embodiment, the scale region extractor 14c performs the following processing.

The scale region extractor 14c sets multiple first subregions in the second direction in the candidate region so that multiple first subregions are arranged in the first direction. The scale region extractor 14c detects the number of line segments extending in the second direction for each of the first subregions. The scale region extractor 14c extracts a portion in the second direction of the candidate region as the scale area in which the graduations of the meter exist based on the detected numbers of the line segments.

According to the processing, it is unnecessary to preregister the position of the scale region of the meter, and the area in which graduations exist can be extracted more appropriately from the candidate region. Therefore, it is unnecessary for the user to preregister the positions of the graduations of the meters for reading the indication. By more appropriately extracting the scale area, the accuracy of the reading of the indication using the scale area can be increased.

In the reading support system 1, the scale region extractor 14c also performs the following processing.

The scale region extractor 14c sets multiple second subregions in the first direction for the scale area so that the multiple second subregions are arranged in the second direction. The scale region extractor 14c detects the number of line segments extending in the second direction for each of the second subregions. Based on the detected numbers of the line segments, the scale region extractor 14c extracts a portion in the first direction of the scale area as the scale region in which the graduations of the meter exist.

By performing such processing after extracting the scale area, the region in which the graduations exist can be extracted with higher accuracy from the scale area. For example, by using the scale region to read the indication, the accuracy of the reading can be increased.

In the reading support system 1 according to the first embodiment, the pointer region extractor 14d performs the following processing.

When the type of the meter is round, the pointer region extractor 14d sets a circular detection region for detecting the pointer of the meter in the candidate region. The pointer region extractor 14d changes the size of the detection region and determines the angle of the pointer in the detection region of each size, and extracts the pointer region in which the pointer exists from the candidate region based on the result of the determination. According to the processing, it is unnecessary to preregister the position of the pointer region of the meter, and the pointer region can be extracted more appropriately from the candidate region.

In particular, the pointer region extractor 14d determines the first and second ranges for the size from the result of the change of the angle with respect to the change of the size. Then, the pointer region extractor 14d extracts a circular-ring shaped pointer region having an outer diameter based on the upper limit of the first range and an inner diameter based on the upper limit of the second range. According to this processing, the regions that have little contribution to the recognition of the pointer can be excluded from the pointer region. The accuracy of the reading can be increased by using the pointer region extracted by this processing to read the indication.

Second Embodiment

Figure 17:
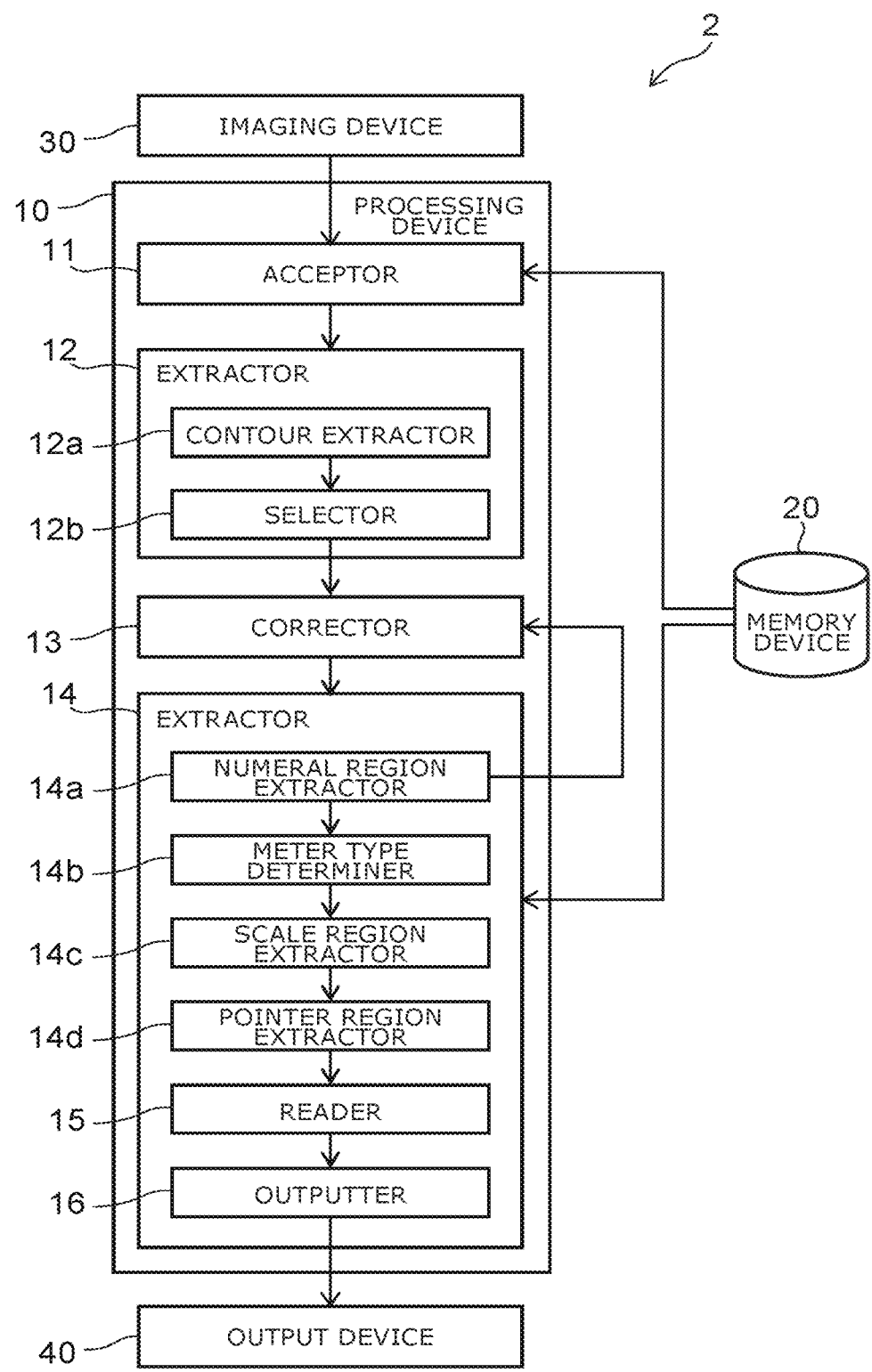
FIG. 17 is a block diagram illustrating a configuration of a reading support system according to a second embodiment.

FIG. 17 is a block diagram illustrating a configuration of a reading support system according to a second embodiment.

The reading support system 2 according to the second embodiment further includes an imaging device 30. The imaging device 30 generates an image by imaging the meter. The imaging device 30 transmits the generated image to the processing device 10. Or, the imaging device 30 may store the image in the memory device 20. The processing device 10 accesses the memory device 20 and refers to the stored image. When the imaging device 30 acquires a video image, the imaging device 30 extracts a static image from the video image and transmits the static image to the processing device 10. The imaging device 30 includes, for example, a camera.

The processing device 10 transmits, to an output device 40, information based on characters that are identified and read. The output device 40 outputs the information received from the processing device 10 so that the user can recognize the information. The output device 40 includes, for example, at least one of a monitor, a printer, or a speaker.

For example, the processing device 10, the memory device 20, the imaging device 30, and the output device 40 are connected to each other by a wired or wireless technique. Or, these devices may be connected to each other via a network. Or, two or more of the processing device 10, the memory device 20, the imaging device 30, or the output device 40 may be embedded in one device. For example, the processing device 10 may be embedded in an integral body with the image processor of the imaging device 30, etc.

Third Embodiment

Figure 18:
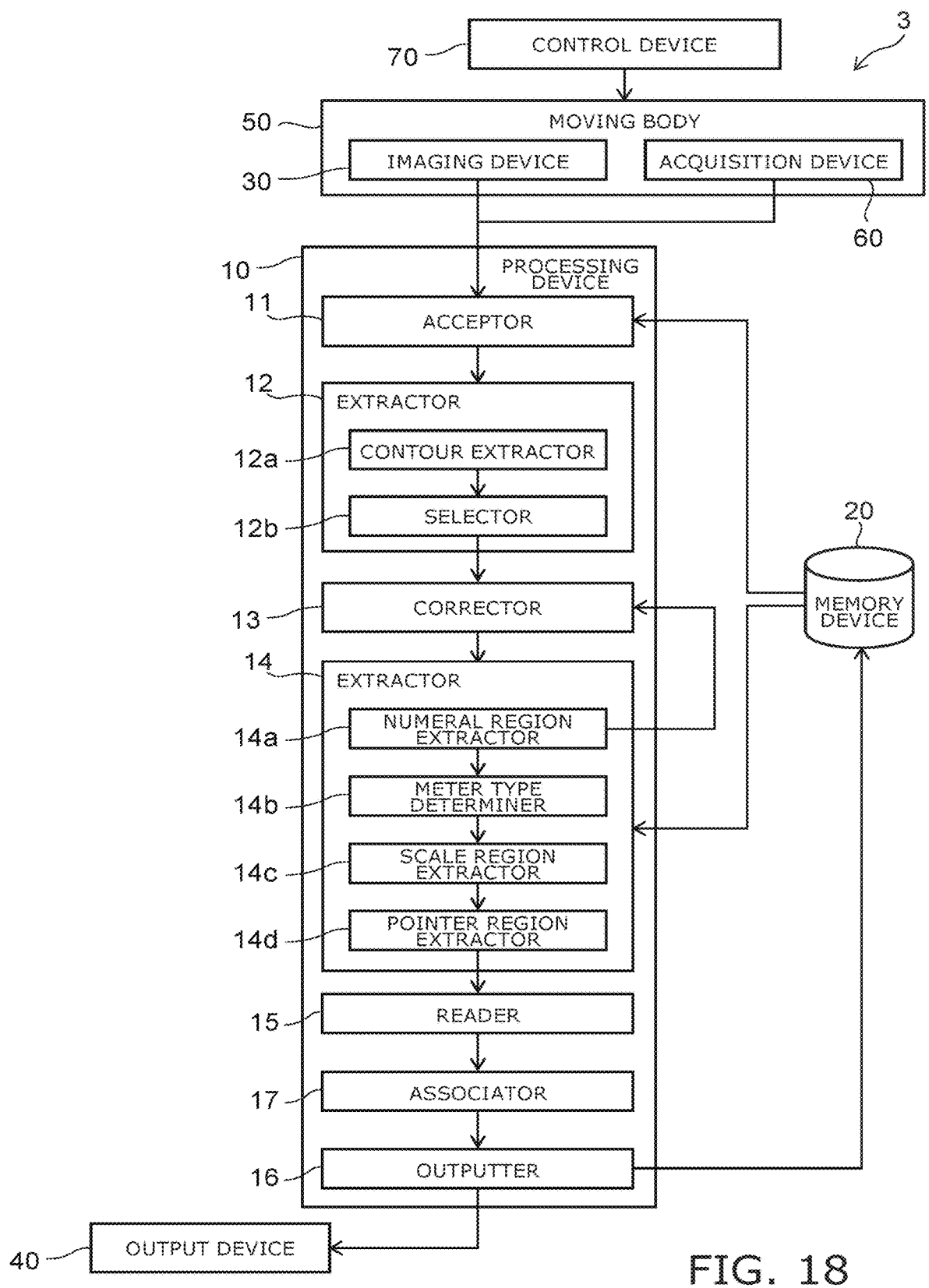
FIG. 18 is a block diagram illustrating a configuration of a reading support system according to a third embodiment.

FIG. 18 is a block diagram illustrating a configuration of a reading support system according to a third embodiment.

The reading support system 3 according to the third embodiment further includes a moving body 50. The moving body 50 moves through a prescribed area. A meter is provided inside the area through which the moving body 50 moves. The moving body 50 is, for example, an automated guided vehicle (AGV). The moving body 50 may be a flying object such as a drone, etc. The moving body 50 may be an independent walking robot. The moving body 50 may be an unmanned forklift, crane, or the like that performs a prescribed operation.

For example, the processing device 10 and the imaging device 30 are mounted to the moving body 50. The processing device 10 may be provided separately from the moving body 50 and may be connected to the moving body 50 via a network. When the moving body 50 moves to a position where the meter is imagable, the imaging device 30 generates an image by imaging the meter.

As illustrated in FIG. 18, the reading support system 3 may further include an acquisition device 60. The acquisition device 60 is mounted to the moving body 50. For example, an identifier that includes unique identification information corresponding to the meter is provided. The acquisition device 60 acquires the identification information of the identifier.

As illustrated in FIG. 18, the reading support system 3 may further include a control device 70. The control device 70 controls the moving body 50. The moving body 50 moves through the prescribed area based on a command transmitted from the control device 70. The control device 70 may be mounted to the moving body 50 or may be provided separately from the moving body 50. The control device 70 includes, for example, a processing circuit made of a central processing unit. One processing circuit may function as both the processing device 10 and the control device 70.

For example, the identifier is a radio frequency (RF) tag including ID information. The identifier emits an electromagnetic field or a radio wave including the ID information. The acquisition device 60 acquires the ID information by receiving the electromagnetic field or the radio wave emitted from the identifier.

Or, the identifier may be a one-dimensional or two-dimensional barcode. The acquisition device 60 may be a barcode reader. The acquisition device 60 acquires the identification information of the barcode by reading the barcode.

As illustrated in FIG. 18, the processing device 10 may further include an associator 17. For example, when acquiring the identification information, the acquisition device 60 transmits the identification information to the processing device 10. The associator 17 associates the transmitted identification information and the characters that are read. The associated information is stored in the memory device 20.

Figure 19:
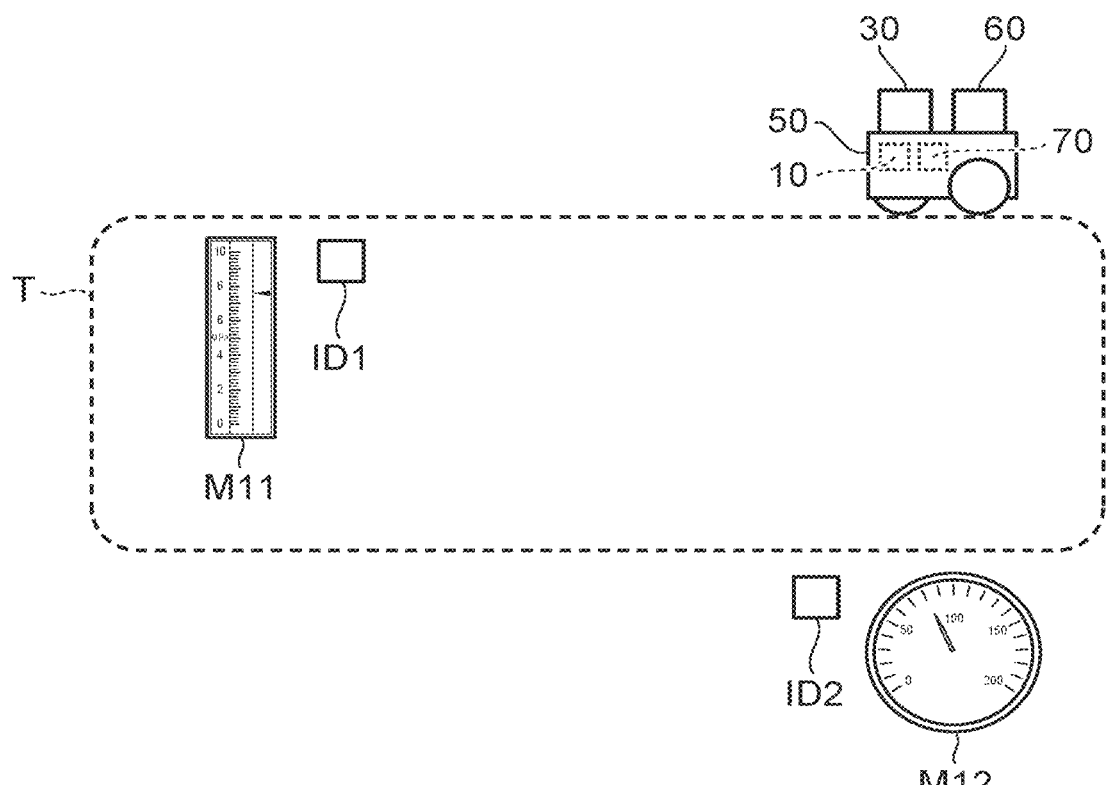
FIG. 19 is a schematic view describing an operation of the reading support system according to the third embodiment.

FIG. 19 is a schematic view describing an operation of the reading support system according to the third embodiment.

For example, the moving body 50 is a moving body moving along a prescribed trajectory T. The imaging device 30 and the acquisition device 60 are mounted to the moving body 50. The processing device 10 may be mounted to the moving body 50 or may be provided separately from the moving body 50. The trajectory T is provided so that the moving body 50 passes in front of meters M11 and M12.

For example, the moving body 50 moves along the trajectory T and decelerates or stops when arriving at a position where the meter M11 or M12 is imagable by the imaging device 30. For example, when decelerating or stopping, the moving body 50 transmits an imaging command to the imaging device 30. Or, the imaging command may be transmitted to the imaging device 30 from the control device 70. When receiving the command, the imaging device 30 images the meter M11 or M12 while the moving body 50 has decelerated or stopped.

Or, the moving body 50 moves along the trajectory T at a speed such that the imaging device 30 can image the meter M11 or M12 without blur. When the position where the meter M11 or M12 is imagable by the imaging device 30 is reached, the imaging command is transmitted from the moving body 50 or the control device described above. When receiving the command, the imaging device 30 images the meter M11 or M12. When the image has been generated by imaging, the imaging device 30 transmits the image to the processing device 10 mounted to the moving body 50 or provided separately from the moving body 50.

An identifier ID1 is provided at the meter M11 vicinity. An identifier ID2 is provided at the meter M12 vicinity. For example, the acquisition device 60 acquires the identification information of the identifier ID1 or ID2 while the moving body 50 has decelerated or stopped.

For example, the moving body 50 moves in front of the meter M11. The imaging device 30 generates an image by imaging the meter M11. The processing device 10 identifies the characters displayed by the meter M11 from the image. The acquisition device 60 acquires the identification information of the identifier ID1 corresponding to the meter M11. The processing device 10 associates the identification information and the identified characters.

The processing of the processing device 10 is particularly favorable when the imaging device 30 is mounted to the moving body 50 and sequentially images multiple meters as illustrated in FIG. 19. Because the type of the meter is determined automatically by the numeral region extractor 14*a* and the type determiner 14*b*, it is unnecessary for the user to preregister the type of the meter.

There is also a possibility that fluctuation of the image may occur according to the state of the moving body 50. The numeral region, the scale region, and the pointer region are extracted automatically from the candidate region by the numeral region extractor 14*a*, the scale region extractor 14*c*, and the pointer region extractor 14*d* according to the processing by the processing device 10 even when fluctuation occurs in the image. Therefore, the accuracy of the reading of the indication can be increased.

Figure 20:
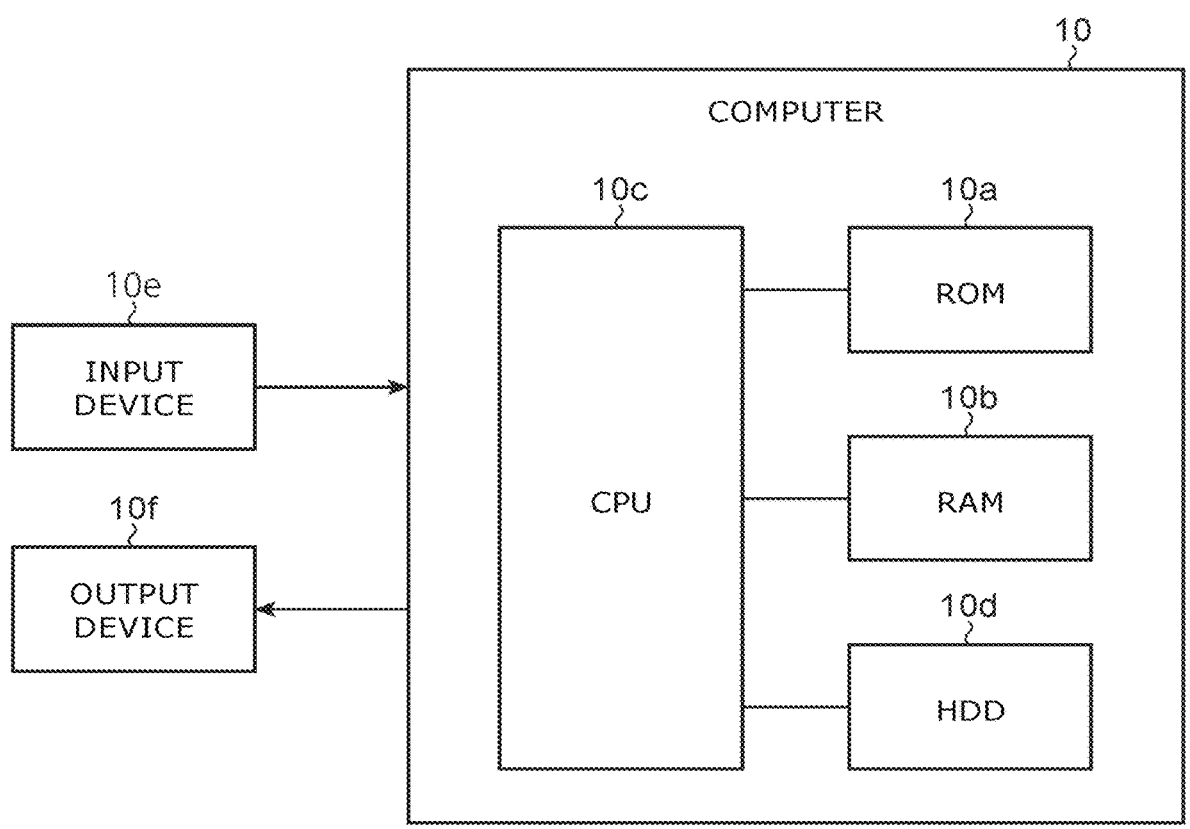
FIG. 20 is a block diagram illustrating a hardware configuration of the reading support systems according to the embodiments.

FIG. 20 is a block diagram illustrating a hardware configuration of the reading support systems according to the embodiments.

For example, the processing device 10 of the reading support systems 1 to 3 is a computer and includes ROM (Read Only Memory) 10*a*, RAM (Random Access Memory) 10*b*, a CPU (Central Processing Unit) 10*c*, and a HDD (Hard Disk Drive) 10*d*.

The ROM 10*a* stores programs controlling the operations of the computer. The ROM 10*a* stores programs necessary for causing the computer to function as the controller 10.

The RAM 10*b* functions as a memory region where the programs stored in the ROM 10*a* are loaded. The CPU 10*c* includes a processing circuit. The CPU 10*c* reads a control program stored in the ROM 10*a* and controls the operation of the computer according to the control program. The CPU 10*c* loads various data obtained by the operation of the computer into the RAM 10*b*. The HDD 10*d* stores information necessary for reading and information obtained in the reading process. For example, the HDD 10*d* functions as the memory device 20 illustrated in FIG. 1.

Instead of the HDD 10*d*, the controller 10 may include an eMMC (embedded Multi Media Card), a SSD (Solid State Drive), a SSHD (Solid State Hybrid Drive), etc.

An input device 10*e* and an output device 10*f* may be connected to the controller 10. The user uses the input device 10*e* to input information to the controller 10. The input device 10*e* includes at least one of a mouse, a keyboard, a microphone (audio input), or a touchpad. Information that is transmitted from the controller 10 is output to the output device 10*f*. The output device 10*f* includes at least one of a monitor, a speaker, a printer, or a projector. A device such as a touch panel that functions as both the input device 10*e* and the output device 10*f* may be used.

A hardware configuration similar to FIG. 20 is applicable also to the control device 70 of the reading support system 3. Or, one computer may function as the processing device 10 and the control device 70 in the reading support system 3. The processing and the functions of the processing device 10 and the control device 70 may be realized by collaboration between more computers.

The embodiments may include the following configurations.

Configuration 1

A moving body moving through a prescribed area, the moving body comprising:
an imaging device acquiring an image by imaging a meter; and
a processing device receiving an input of the image,
the processing device including
an extractor extracting a candidate region from the image, the candidate region being a candidate of a region in which a meter is imaged, and
a scale region extractor that:
sets multiple subregion columns in a second direction perpendicular to a first direction for a candidate region, the candidate region being a candidate of a region in which a meter is imaged, each of the subregion columns including a plurality of subregions arranged in the first direction;
detects a number of line segments extending in the second direction for each of the subregions; and
extracts, based on the detected numbers of the line segments, a portion in the second direction of the candidate region as a scale area in which a graduation of the meter exists.

Configuration 2

The moving body according to Configuration 1, wherein the scale region extractor:
sets multiple subregion rows in the first direction for the scale area, each of the subregion rows including a plurality of second subregions arranged in the second direction;
detects a number of line segments extending in the second direction for each of the second subregions; and
extracts, based on the detected numbers of the line segments, a portion in the first direction of the scale area as a scale region in which a graduation of the meter exists.

Configuration 3

A reading support method, comprising:
extracting a plurality of characters from a candidate region, the candidate region being a candidate of a region in which a meter is imaged;
calculating match rates between a numeral and each of the plurality of characters while rotating the plurality of characters;
determining, as a plurality of numerals of the meter, at least a portion of the plurality of characters of which the match rate is not less than a prescribed threshold;
extracting a plurality of numeral regions respectively including the plurality of numerals from the candidate region; and
determining a type of the meter based on positions of the plurality of numeral regions.

Configuration 4

A reading support method, comprising:
setting a plurality of subregion columns in a second direction perpendicular to a first direction for a candidate region, the candidate region being a candidate of a region in which a meter is imaged, each of the subregion columns including a plurality of first subregions arranged in the first direction;
detecting a number of line segments extending in the second direction for each of the first subregions; and
extracting, based on the detected numbers of the line segments, a portion in the second direction of the candidate region as a scale area in which a graduation of the meter exists.

Configuration 5

A storage medium storing a program causing a processing device to function as:
a numeral region extractor extracting a plurality of numeral regions from a candidate region, the candidate region being a candidate of a region in which a meter is imaged, the plurality of numeral regions respectively including a plurality of numerals of the meter; and
a type determiner determining a type of the meter based on positions of the plurality of numeral regions.

Configuration 6

A storage medium storing a program causing a processing device to function as a scale region extractor that:
sets a plurality of subregion columns in a second direction perpendicular to a first direction for a candidate region, the candidate region being a candidate of a region in which a meter is imaged, each of the subregion columns including a plurality of first subregions arranged in the first direction;
detects a number of line segments extending in the second direction for each of the first subregions; and
extracting, based on the detected numbers of the line segments, a portion in the second direction of the candidate region as a scale area in which a graduation of the meter exists.

By using the reading support system, the reading support method, and the moving body according to the embodiments described above, the numerals displayed by the meter can be read with higher accuracy. Similarly, by using a program for causing a computer to operate as the reading support system, the numerals displayed by the meter can be read by the computer with higher accuracy.

For example, the processing of the various data recited above is executed based on a program (software). For example, the processing of the various information recited above is performed by a computer storing the program and reading the program.

The processing of the various information recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the information that is recorded in the recording medium can be read by a computer (or an embedded system). The recording format (the storage format) of the recording medium is arbitrary. For example, the computer reads the program from the recording medium and causes a CPU to execute the instructions recited in the program based on the program. The acquisition (or the reading) of the program by the computer may be performed via a network.

The processing device and the control device according to the embodiments include one or multiple devices (e.g., personal computers, etc.). The processing device and the control device according to the embodiments may include multiple devices connected by a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A reading support system, comprising:
a processing device including
an extractor extracting a plurality of regions from a candidate region, the candidate region being a candidate of a region in which a meter is imaged, the plurality of regions respectively including a plurality of characters of the meter, and
a type determiner determining a type of the meter based on positions of the plurality of regions.

2. The reading support system according to claim 1, wherein
the extractor includes a numeral region extractor, and
the numeral region extractor extracts a plurality of numeral regions, as the plurality of regions, respectively including a plurality of numerals.

3. The reading support system according to claim 2, wherein
the numeral region extractor:
extracts a plurality of characters from the candidate region;
calculates match rates between a numeral and each of the plurality of characters while rotating the plurality of characters; and
extracts, as the plurality of numeral regions of the meter, at least a portion of the plurality of characters of which the match rate is not less than a prescribed threshold.

4. The reading support system according to claim 2, wherein
the type determiner determines the type of the meter to be round when the plurality of numerals is arranged in a curve, and determines the type of the meter to be vertical or horizontal when the plurality of numerals is arranged along one direction.

5. The reading support system according to claim 2, wherein
the extractor further includes a scale region extractor that:
sets a plurality of subregion columns in a second direction perpendicular to a first direction for the candidate region, each of the subregion columns including a plurality of first subregions arranged in the first direction;
detects a number of line segments extending in the second direction for each of the first subregions; and
extracts, based on the detected numbers of the line segments, a portion in the second direction of the candidate region as a scale area in which a graduation of the meter exists.

6. The reading support system according to claim 5, wherein
the scale region extractor:
sets a plurality of subregion rows in the first direction for the scale area, each of the subregion rows including a plurality of second subregions arranged in the second direction;
detects a number of line segments extending in the second direction for each of the second subregions; and
extracts, based on the detected numbers of the line segments, a portion in the first direction of the scale area as a scale region in which a graduation of the meter exists.

7. The reading support system according to claim 6, further comprising:
a corrector performing at least a projective transformation of the candidate region,
the numeral region extractor extracting the numeral regions from the candidate region of the projective transformation,
the scale region extractor extracting the scale region from the candidate region of the projective transformation.

8. The reading support system according to claim 6, wherein
the numeral region extractor outputs the positions of the plurality of numeral regions to the corrector,
the corrector re-performs a projective transformation of the candidate region based on the positions of the plurality of numeral regions,
the numeral region extractor extracts the numeral regions from the candidate region of the re-performed projective transformation, and
the scale region extractor extracts the scale region from the candidate region of the re-performed projective transformation.

9. The reading support system according to claim 6, wherein
when the type of the meter is round, the scale region extractor performs at least a polar transformation of the candidate region and extracts the scale area and the scale region from the candidate region of the polar transformation.

10. The reading support system according to claim 9, wherein
the scale region extractor:
corrects a center of a polar coordinate system of the polar transformation to approach a center of the meter by using a graduation of the meter in the scale area or the scale region;
re-performs a polar transformation of the candidate region based on the corrected center of the polar coordinate system; and
extracts the scale area and the scale region from the candidate region of the re-performed polar transformation.

11. The reading support system according to claim 6, wherein
the processing device further includes a reader reading an indication of the meter based on the extracted numeral regions and the extracted scale region.

12. The reading support system according to claim 2, wherein
the processing device further includes a pointer region detector that:
sets a detection region in the candidate region to be circular when the type of the meter is round, the detection region being for detecting a pointer of the meter;
changes a size of the detection region and determines an angle of the pointer for the detection region for each of the sizes; and
extracts, from the candidate region, a pointer region in which the pointer exists based on a result of a change of the angle with respect to the change of the size.

13. The reading support system according to claim 12, wherein
the pointer region detector:
determines, from the result of the change of the angle with respect to the change of the size, a first range of the size in which the change of the angle is not more than a first threshold, and a second range of the size in which the change of the angle is not less than a second threshold, the second threshold being greater than the first threshold; and extracts the pointer region having a circular ring configuration, the circular ring configuration having an outer diameter based on an upper limit of the first range and having an inner diameter based on an upper limit of the second range.

14. The reading support system according to claim 1, further comprising:
an imaging device acquiring an image by imaging the meter, the image including the candidate region.

15. The reading support system according to claim 14, wherein
the imaging device images a video image in which the meter is imaged, and cuts out the image from the video image.

16. The reading support system according to claim 14, further comprising:
a moving body moving through a prescribed area and having the imaging device mounted to the moving body.

17. A reading support system, comprising:
a processing device including a scale region extractor that:
sets a plurality of subregion columns in a second direction perpendicular to a first direction for a candidate region, the candidate region being a candidate of a region in which a meter is imaged, each of the subregion columns including a plurality of first subregions arranged in the first direction;
detects a number of line segments extending in the second direction for each of the first subregions; and
extracts, based on the detected numbers of the line segments, a portion in the second direction of the candidate region as a scale area in which a graduation of the meter exists, wherein the scale region extractor: sets a plurality of subregion rows in the first direction for the scale area, each of the subregion rows including a plurality of second subregions arranged in the second direction; detects a number of line segments extending in the second direction for each of the second subregions; and extracts, based on the detected numbers of the line segments, a portion in the first direction of the scale area as a scale region in which a graduation of the meter exists.

18. The reading support system according to claim 17, further comprising:
an imaging device acquiring an image by imaging the meter, the image including the candidate region.

19. The reading support system according to claim 18, wherein
the imaging device images a video image in which the meter is imaged, and cuts out the image from the video image.

20. The reading support system according to claim 18, further comprising:
a moving body moving through a prescribed area and having the imaging device mounted to the moving body.

21. A moving body moving through a prescribed area, the moving body comprising:
an imaging device acquiring an image by imaging a meter; and
a processing device receiving an input of the image, the processing device including
an extractor extracting a candidate region from the image, the candidate region being a candidate of a region in which a meter is imaged,
a numeral region extractor extracting a plurality of numeral regions from the candidate region, a plurality of numerals of the meter being positioned in the numeral region, and
a type determiner determining a type of the meter based on positions of the plurality of numeral regions.

22. The moving body according to claim 21, wherein
the imaging device images a video image in which the meter is imaged, and cuts out the image from the video image.

* * * * *